US007804266B2

(12) United States Patent
Tomigashi

(10) Patent No.: US 7,804,266 B2
(45) Date of Patent: Sep. 28, 2010

(54) MOTOR CONTROL DEVICE

(75) Inventor: Yoshio Tomigashi, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 184 days.

(21) Appl. No.: 11/853,625

(22) Filed: Sep. 11, 2007

(65) Prior Publication Data
US 2008/0061727 A1 Mar. 13, 2008

(30) Foreign Application Priority Data
Sep. 11, 2006 (JP) .............................. 2006-245025

(51) Int. Cl.
G05B 11/28 (2006.01)
(52) U.S. Cl. ...................................... 318/599; 318/811
(58) Field of Classification Search ................. 318/599, 318/811, 432, 434, 400.02
See application file for complete search history.

(56) References Cited
U.S. PATENT DOCUMENTS

| | | | |
|---|---|---|---|
| 5,787,376 A * | 7/1998 | Nishino et al. ................. 701/41 |
| 6,788,024 B2 * | 9/2004 | Kaneko et al. ............... 318/807 |
| 2003/0052640 A1 | 3/2003 | Iwaji et al. | |
| 2004/0183498 A1 | 9/2004 | Iwaji et al. | |
| 2004/0189243 A1* | 9/2004 | Tobari et al. ................. 318/807 |
| 2005/0174090 A1* | 8/2005 | Hayashi ....................... 318/807 |
| 2006/0113948 A1 | 6/2006 | Kaneko et al. | |

2007/0159130 A1* 7/2007 Kaneko et al. ............... 318/806
2007/0296375 A1* 12/2007 Sakaguchi et al. .......... 318/811

FOREIGN PATENT DOCUMENTS

| | | |
|---|---|---|
| CN | 1783694 A | 6/2006 |
| EP | 1432113 A1 | 6/2004 |
| JP | 2712470 | 10/1997 |
| JP | 2003-189670 | 7/2003 |
| JP | 2003-219678 A | 7/2003 |
| JP | 2004-64903 | 2/2004 |
| JP | 2004-64903 A | 2/2004 |
| JP | 2007-312511 A | 11/2007 |

OTHER PUBLICATIONS

Sugimoto et al., "Practical theory and design of AC servo system," SOGO Denshi Shuppansha, Jan. 1990, pp. 80-85.

(Continued)

Primary Examiner—Rina I Duda
(74) Attorney, Agent, or Firm—Ditthavong, Mori & Steiner, P.C.

(57) ABSTRACT

A motor control device includes a current detecting portion that detects current flowing between an inverter for driving a three-phase motor and a DC power supply for supplying DC voltage to the inverter, a current estimator that estimates a current vector of the motor on a rotating coordinate that rotates along with rotation of a rotor of the motor. The motor control device detects motor current flowing in the motor by using one of a detecting result of the current detecting portion and an estimation result of the current estimator, so as to control the motor via the inverter based on the detected motor current. The current estimator estimates the current vector based on the motor current detected in the past and a specified voltage value, for example.

8 Claims, 16 Drawing Sheets

OTHER PUBLICATIONS

Hajime Hida, et al., "Position Sensorless Vector control for Permanent Magnet Synchronous Motors Based on Maximum Torque Control Frame," Institute of Electric Engineers, Industrial Application Department Conference Lecture Papers, Aug. 2006, pp. 385-388.

Blaabjerg et al., "Single Current Sensor Technique in the DC Link of Three-Phase PWM-VS Inverters: A Review and a Novel Solution", IEEE Transactions on Industry Applications, vol. 33, No. 5, pp. 1-14, 1997.

Chinese Office Action for corresponding CN Application No. 200710148787.6, Aug. 7, 2009, China.

European Extended Search Report for corresponding EP Application No. 07115992.5, Aug. 13, 2009.

* cited by examiner

|  | T1 | T2 | T3 | MODE | DETECTED PHASE CURRENT | |
|---|---|---|---|---|---|---|
|  |  |  |  |  | T1-T2 | T2-T3 |
| $v_u > v_v > v_w$ | CntW | CntV | CntU | 1 | -w | u |
| $v_v > v_u > v_w$ | CntW | CntU | CntV | 2 | -w | v |
| $v_v > v_w > v_u$ | CntU | CntW | CntV | 3 | -u | v |
| $v_w > v_v > v_u$ | CntU | CntV | CntW | 4 | -u | w |
| $v_w > v_u > v_v$ | CntV | CntU | CntW | 5 | -v | w |
| $v_u > v_w > v_v$ | CntV | CntW | CntU | 6 | -v | u |

SAMPLING TIMING
   ST1:T1-T2
   ST2:T2-T3

MOTOR CONTROL DEVICE

This nonprovisional application claims priority under 35 U.S.C. §119(a) on Patent Application No. 2006-245025 filed in Japan on Sep. 11, 2006, the entire contents of which are hereby incorporated by reference.

BACKGROUND OF THE INVENTION

1. Field of the Invention

The present invention relates to a motor control device that drives and controls a motor.

2. Description of Related Art

In order to perform a vector control of a motor by supplying three-phase AC power to the motor, it is necessary to detect current values of two phases (e.g., U-phase current and V-phase current) among three phases including U-phase, V-phase and W-phase. Although two current sensors (current transformers or the like) are usually used for detecting current values of two phases, the use of two current sensors causes an increase of cost of the entire system equipped with the motor.

For this reason, there is provided a conventional method in which bus current (DC current) between an inverter and a DC power supply is sensed by a single current sensor, and current values of two phases are detected from the sensed bus current. This method is also called a single shunt current detecting method.

FIG. 18 shows a general block diagram of a conventional motor driving system in which the single shunt current detecting method is adopted. An inverter (PWM inverter) 202 is equipped with half bridge circuits for three phases, each of which includes an upper arm and a lower arm, and it converts a DC voltage from a DC power supply 204 into a three-phase AC voltage by switching the individual arms in accordance with a specified three-phase voltage value given by the controller 203. The three-phase AC voltage is supplied to a three-phase permanent-magnet synchronous motor 201, so that the motor 201 is driven and controlled.

A line connecting the individual lower arms in the inverter 202 with the DC power supply 204 is called a bus line 213. The current sensor 205 transmits a signal indicating bus current that flows in the bus line 213 to the controller 203. The controller 203 does sampling of an output signal of the current sensor 205 at appropriate timing so as to detect phase current of a phase in which a voltage level becomes a maximum value (maximum phase) and phase current of a phase in which a voltage level becomes a minimum value (minimum phase), i.e., current values of two phases.

If voltage levels of phases are separated from each other sufficiently, current values of two phases can be detected by the process described above. However, if the maximum phase of voltage and an intermediate phase become close to each other, or if the minimum phase of voltage and the intermediate phase become close to each other, it is difficult to detect current values of two phases. Note that description of the single shunt current detecting method including description of a reason why it becomes difficult to detect current values of two phases will appear later with reference to FIGS. 3, 4 and 5A-5D.

Considering this, in a certain conventional method, if current values of two phases cannot be detected by the single shunt current detecting method in a certain period, current values of three phases are estimated from past current information in the period. More specifically, d-axis current and q-axis current obtained by converting past current values of three phases are inversely converted into current values of three phases so as to estimate them.

In another conventional method, if current values of two phases cannot be detected by the single shunt current detecting method in a certain period, a pulse width of a PWM signal for each arm in the inverter is corrected based on gate signals of three phases in the period.

A usual correction example of a specified voltage value (pulse width) that corresponds to the above-mentioned correction is shown in FIG. 19. In FIG. 19, the horizontal axis indicates time, while $220u$, $220v$ and $220w$ show voltage levels of the U-phase, the V-phase and the W-phase, respectively. Since a voltage level of each phase follows the specified voltage value (pulse widths) for each phase, they are considered to be equivalent. As shown in FIG. 19, the specified voltage value (pulse width) of each phase is corrected so that "maximum phase and intermediate phase" as well as "minimum phase and intermediate phase" of the voltage do not approach each other closer than a predetermined distance. Thus, voltages of individual phases do not become close to each other to the extent that current values of two phases cannot be detected, and current values of two phases can be detected stably.

However, if such correction of voltage is performed, voltage (applied voltage vector of the motor) becomes discontinuous in a peripheral period in which voltages of individual phases cross each other which may cause a bad influence for smooth drive of the motor.

As described above, although cost reduction of the entire system can be expected by adopting the single shunt current detecting method, there is a problem unique to the single shunt current detecting method. A technique to solve this problem is desired anxiously.

SUMMARY OF THE INVENTION

A motor control device according to the present invention includes a current detecting portion that detects current flowing between an inverter for driving a three-phase motor and a DC power supply, as detected current, and a current estimator that estimates a current vector of the motor on a rotating coordinate that rotates along with rotation of a rotor of the motor. The motor control device detects motor current flowing in the motor by using one of a detecting result of the current detecting portion and an estimation result of the current estimator, so as to control the motor via the inverter based on the detected motor current.

For example, the current estimator estimates the current vector based on the motor current detected in the past and a specified voltage value indicating a voltage value that an applied voltage to the motor should follow.

More specifically, for example, the motor control device further includes a specified voltage value deriving portion that derives the specified voltage value based on the motor current and a specified current value indicating a current value that the motor current should follow. The inverter drives the motor in accordance with the specified voltage value, and the current estimator estimates orthogonal biaxial components that form the current vector, based on the motor current detected in the past and the specified voltage value.

In addition, for example, the current estimator estimates the current vector based on the motor current detected in the past and a specified current value indicating a current value that the motor current should follow.

More specifically, for example, the motor control device further includes a specified voltage value deriving portion that derives the specified current value based on a given external specified value, and derives a specified voltage value indicating a voltage value that an applied voltage to the motor should follow by decoupling control, so that the motor current follows the specified current value. The inverter drives the motor in accordance with the specified voltage value, and the current estimator estimates orthogonal biaxial components that form the current vector, based on the motor current detected in the past and the specified current value.

In addition, for example, the inverter is a PWM inverter that generates a three-phase PWM signal in accordance with a specified three-phase voltage value derived based on the detected motor current and a specified current value indicating a current value that the motor current should follow, phase current is supplied to an armature winding of each phase provided to the motor in accordance with a pulse width of the PWM signal of each phase, and the motor control device further includes a switch controlling portion that switches between detection of the motor current based on the detected current and detection of the motor current based on the current vector, in accordance with the pulse width of the PWM signal of each phase.

In addition, for example, the motor control device may further include a switch controlling portion that switches between detection of the motor current based on the detected current and detection of the motor current based on the current vector, in accordance with a voltage vector applied to the motor.

In addition, a motor driving system according to the present invention includes a three-phase motor, an inverter that drives the motor, and a motor control device according to any one of the above descriptions that controls the inverter so as to control the motor.

BRIEF DESCRIPTION OF THE DRAWINGS

FIG. 6 is a diagram as a table showing combinations (modes) of a relationship of phase voltage levels in the motor shown in FIG. 1 and phases of current detected in the combinations.

DETAILED DESCRIPTION OF THE PREFERRED EMBODIMENTS

Figure 1:
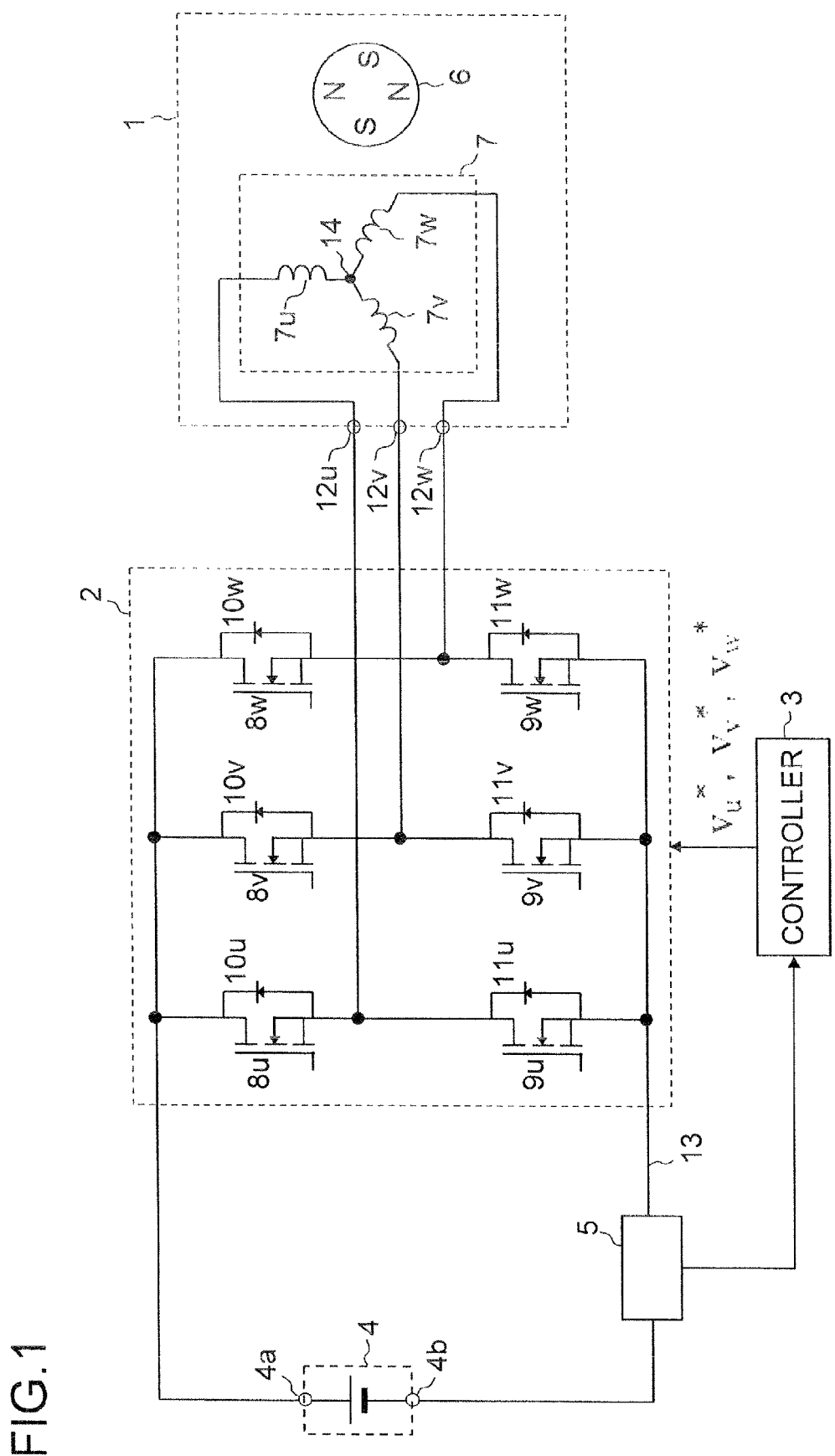
FIG. 1 is a block diagram of a general structure of a motor driving system according to an embodiment of the present invention.

Hereinafter, an embodiment of the present invention will be described concretely with reference to the attached drawings. In the drawings to be referred to, the same portions are denoted by the same references so that overlapping descriptions for the same portions will be omitted as a general rule.

Before describing first to sixth examples, items that are common to the examples and items to be referred to in each example will be described first. FIG. 1 is a block diagram of a motor driving system according to the embodiment of the present invention.

The motor driving system shown in FIG. 1 is equipped with a three-phase permanent-magnet synchronous motor 1 (hereinafter referred to as a "motor 1" simply), a PWM (Pulse Width Modulation) inverter 2 (hereinafter referred to as an "inverter 2" simply), a controller 3, a DC power supply 4 and a current sensor 5. The DC power supply 4 delivers a DC voltage between a positive output terminal 4a and a negative output terminal 4b so that the negative output terminal 4b becomes a low voltage side. The motor driving system shown in FIG. 1 adopts a single shunt current detecting method.

The motor 1 includes a rotor 6 to which a permanent magnet is provided and a stator 7 to which armature windings 7u, 7v and 7w of U-phase, V-phase and W-phase are provided. The armature windings 7u, 7v and 7w are connected at a neutral point 14 as a center in a form of Y-connection. Non-connection ends of the armature windings 7u, 7v and 7w that are opposite ends of the neutral point 14 are connected to terminals 12u, 12v and 12w, respectively.

The inverter 2 is provided with a half bridge circuit for the U-phase, a half bridge circuit for the V-phase and a half bridge circuit for the W-phase. Each of the half bridge circuits includes a pair of switching elements. In each of the half bridge circuits, the pair of switching elements are connected in series between the positive output terminal 4a and the negative output terminal 4b of the DC power supply 4, so that each of the half bridge circuits is supplied with a DC voltage from the DC power supply 4.

The half bridge circuit for the U-phase is made up of a high voltage side switching element 8u (hereinafter referred to as an upper arm 8u, too) and a low voltage side switching element 9u (hereinafter referred to as a lower arm 9u, too). The half bridge circuit for the V-phase is made up of a high voltage side switching element 8v (hereinafter referred to as an upper arm 8v, too) and a low voltage side switching element 9v (hereinafter referred to as a lower arm 9v, too). The half bridge circuit for the W-phase is made up of a high voltage side switching element 8w (hereinafter referred to as an upper arm 8w, too) and a low voltage side switching element 9w (hereinafter referred to as a lower arm 9w, too). In addition, the switching elements 8u, 8v, 8w, 9u, 9v and 9w are respectively connected to diodes 10u, 10v, 10w, 11u, 11v and 11w in parallel so that the direction from the low voltage side to the high voltage side of the DC power supply 4 becomes the forward direction. Each of the diodes works as a freewheel diode.

The connection node of the upper arm 8u and the lower arm 9u that are connected in series, the connection node of the upper arm 8v and the lower arm 9v that are connected in series, the connection node of the upper arm 8w and the lower arm 9w that are connected in series are connected to the terminals 12u, 12v and 12w, respectively. Note that field-effect transistors are shown as the switching elements in FIG. 1, but they can be replaced with IGBTs (Insulated Gate Bipolar Transistors) or the like.

The inverter 2 generates a PWM (Pulse Width Modulation) signal for each phase based on a specified three-phase voltage value supplied from the controller 3 and supplies the PWM signal to a control terminal (base or gate) of each switching element in the inverter 2, so that each switching element performs switching action. The specified three-phase voltage value that is supplied from the controller 3 to the inverter 2 includes a specified U-phase voltage value $v_u^*$, a specified V-phase voltage value $v_v^*$ and a specified W-phase voltage value $v_w^*$. The specified voltage values $v_u^*$, $v_v^*$ and $v_w^*$ represent voltage levels (voltage values) of the U-phase voltage $v_u$, V-phase voltage $v_v$ and W-phase voltage $v_w$, respectively. Then, the inverter 2 controls on (conducting state) or off (nonconducting state) of the switching elements based on the specified voltage values $v_u^*$, $v_v^*$ and $v_w^*$.

Ignoring a dead time for preventing the upper arm and the lower arm of the same phase from becoming the on state simultaneously, the upper arm is on when the lower arm is off in each half bridge circuit. On the contrary, the upper arm is off when the lower arm is on. In the following description, the above-mentioned dead time will be ignored.

The DC voltage applied to the inverter 2 by the DC power supply 4 is converted into a three-phase AC voltage that is PWM-modulated (pulse width modulated) by the switching action of the switching elements in the inverter 2. When the three-phase AC voltage is applied to the motor 1, current corresponding to the three-phase AC voltage flows in the armature winding (7u, 7v and 7w) so that the motor 1 is driven.

The current sensor 5 senses current that flows in a bus line 13 of the inverter 2 (hereinafter referred to as "bus current"). The bus current includes a DC component, so it may be regarded as DC current. In the inverter 2, the low voltage sides of the lower arms 9u, 9v and 9w are connected together to the negative output terminal 4b of the DC power supply 4. The wiring line to which the low voltage sides of the lower arms 9u, 9v and 9w are connected together is the bus line 13, and the current sensor 5 is inserted in the bus line 13 in series. The current sensor 5 transmits a signal indicating a current value of the bus current (detected current) to the controller 3. The controller 3 refers to an output signal of the current sensor 5 and the like so as to generate and deliver the above-mentioned specified three-phase voltage value, Note that the current sensor 5 is a shunt resistor, a current transformer or the like, for example. In addition, it is possible to insert the current sensor 5 not in the wire (bus line 13) between the low voltage sides of the lower arms 9u, 9v and 9w and the negative output terminal 4b but in the wire between the high voltage sides of the upper arms 8u, 8v and 8w and the positive output terminal 4a.

Here, with reference to FIGS. 2, 3, 4, 5A-5D, and 6, a relationship between the bus current and the phase current flowing in the armature winding of each phase and the like will be described. The current flowing in the armature windings 7u, 7v and 7w are referred to as U-phase current, V-phase current and W-phase current, respectively, and each of them (or a generic name of them) is referred to as phase current (see FIG. 1). Further, concerning the phase current, a polarity of the current direction flowing from the terminal 12u, 12v or 12w to the neutral point 14 is regarded as positive, while a polarity of the current direction flowing from the neutral point 14 outward is regarded as negative.

Figures 2, 3:
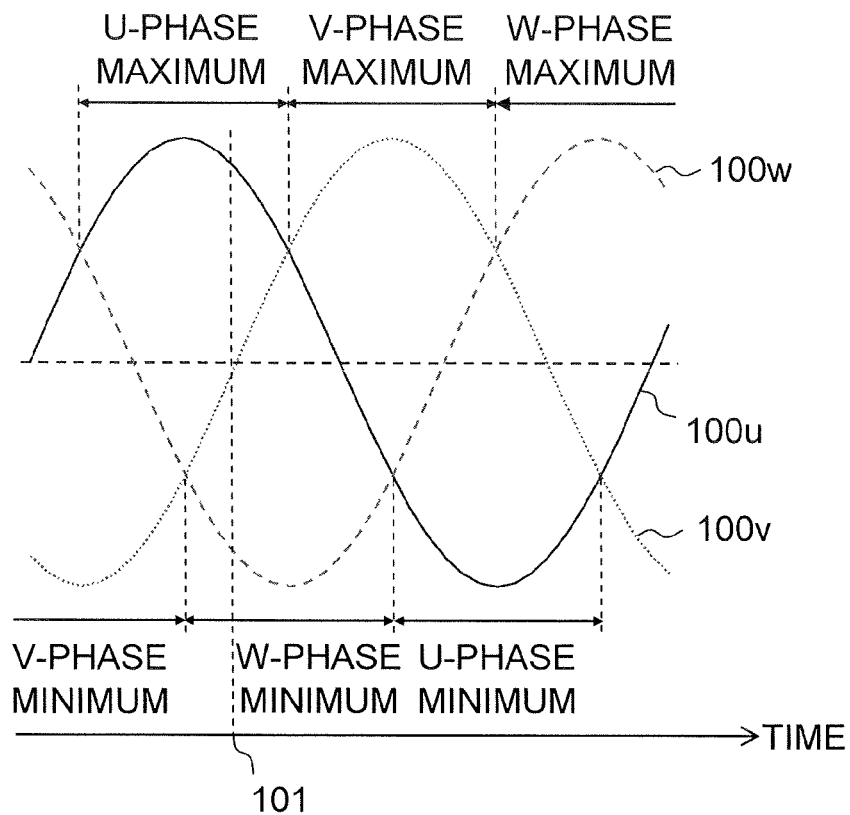
FIG. 2 is a diagram showing a typical example of a three-phase AC voltage that is applied to the motor shown in FIG. 1.
FIG. 3 is a diagram as a table showing a relationship between energizing patterns of the motor shown in FIG. 1 and bus current.

FIG. 2 shows a typical example of the three-phase AC voltage that is applied to the motor 1. In FIG. 2, references 100u, 100v and 100w show waveforms of the U-phase voltage, the V-phase voltage and the W-phase voltage to be applied to the motor 1, respectively. Each of the U-phase voltage, the V-phase voltage and the W-phase voltage (or a generic name of them) is referred to as phase voltage. When sinusoidal current is to be supplied to the motor 1, an output voltage of the inverter 2 should be a sine wave.

As shown in FIG. 2, a relationship among the voltage levels of the U-phase voltage, the V-phase voltage and the W-phase voltage alters as time passes. This relationship is determined by the specified three-phase voltage value, and the inverter 2 decides an energizing pattern for each phase in accordance with the specified three-phase voltage value. FIG. 3 shows this energizing pattern as a table. In FIG. 3, the first to the third columns from the left side indicate the energizing pattern. The fourth column will be described later.

The energizing pattern includes:
an energizing pattern "LLL" in which all the lower arms of the U, V and W-phases are turned on;
an energizing pattern "LLH" in which the upper arm of the W-phase is turned on while the lower arms of the U and V-phases are turned on;
an energizing pattern "LHL" in which the upper arm of the V-phase is turned on while the lower arms of the U and W-phases are turned on;
an energizing pattern "LHH" in which the upper arms of the V and W-phases are turned on while the lower arm of the U-phase is turned on;
an energizing pattern "HLL" in which the upper arm of the U-phase is turned on while the lower arms of the V and W-phases are turned on;
an energizing pattern "HLH" in which the upper arms of the U and W-phases are turned on while the lower arm of the V-phase is turned on;
an energizing pattern "HHL" in which the upper arms of the U and V-phases are turned on while the lower arm of the W-phase is turned on; and
an energizing pattern "HHH" in which all the upper arms of the U, V and W-phases are turned on (references of the upper arms and the lower arms (8u and the like) are omitted).

Figure 4:
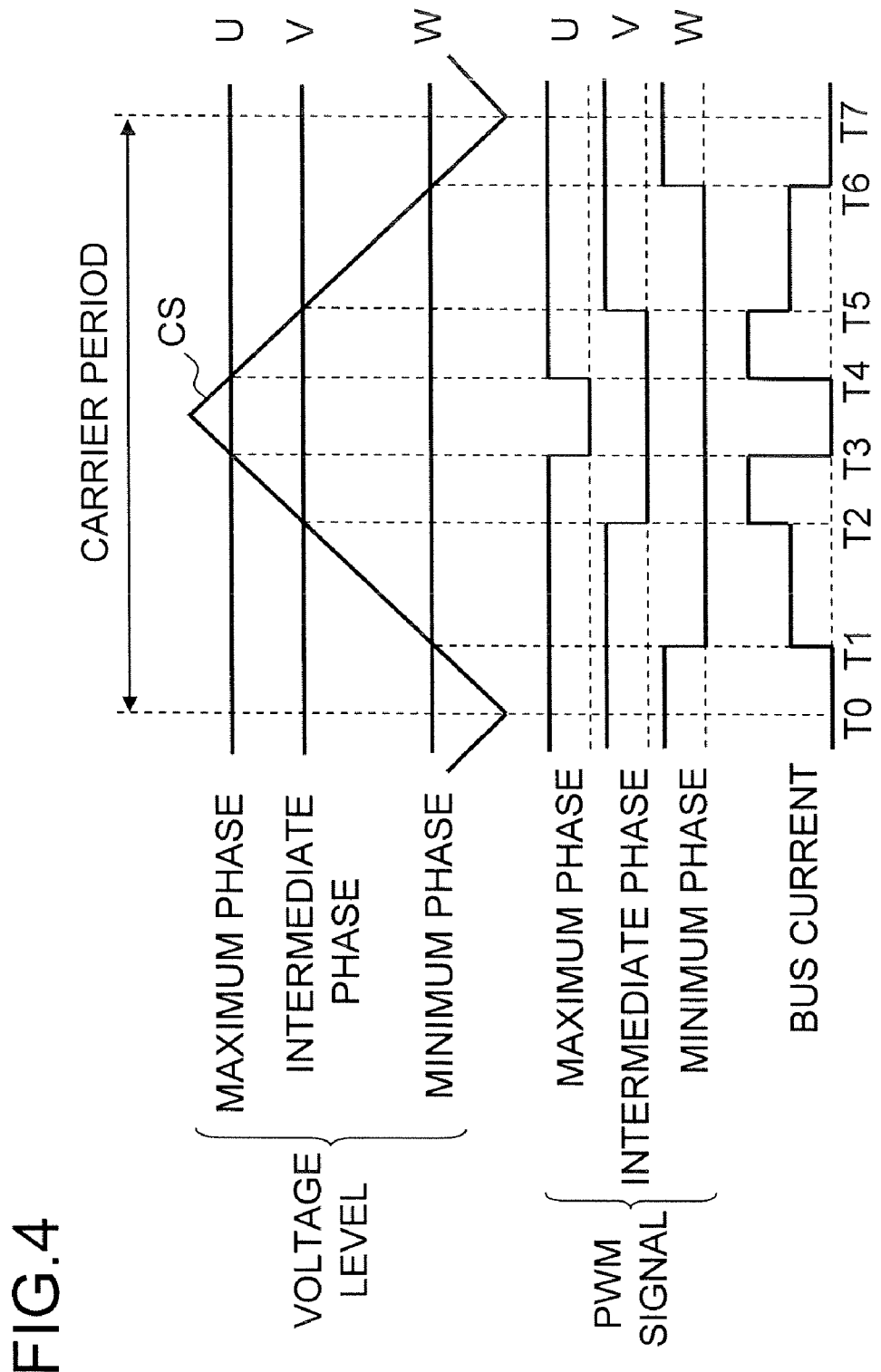
FIG. 4 is a diagram showing a relationship between a voltage level of each phase voltage and a carrier signal in the motor shown in FIG. 1 and waveforms of a PWM signal and bus current corresponding to the relationship.

FIG. 4 shows a relationship between a voltage level of each phase voltage and a carrier signal in the case where three-phase modulation is performed and waveforms of a PWM signal and bus current corresponding to the relationship. The relationship between voltage levels of the individual phase voltages changes variously, but FIG. 4 shows it by noting a certain timing 101 shown in FIG. 2 for concrete description. More specifically, FIG. 4 shows the case where a voltage level of the U-phase voltage is the maximum, and a voltage level of the W-phase voltage is the minimum. The phase having the maximum voltage level is referred to as a "maximum phase", the phase having the minimum voltage level is referred to as a "minimum phase", and the phase whose voltage level is not the maximum or the minimum is referred to as an "intermediate phase". In the state shown in FIG. 4, the maximum phase, the intermediate phase and the minimum phase are the U-phase, the V-phase and the W-phase, respectively. In FIG. 4, reference CS denotes a carrier signal that is compared with a voltage level of each phase voltage. The carrier signal is a periodical signal of a triangular wave, and the period of the signal is referred to as a carrier period. Note that the carrier period is much shorter than a period of the three-phase AC voltage shown in FIG. 2. Therefore, if the triangular wave of the carrier signal shown in FIG. 4 is added to the diagram of FIG. 2, the triangular wave will look like a single line.

Further with reference to FIGS. 5A-5D, a relationship between the phase current and the bus current will be described. FIGS. 5A-5D are equivalent circuits of the armature windings and a periphery thereof at individual timings shown in FIG. 4.

Figure 5A:
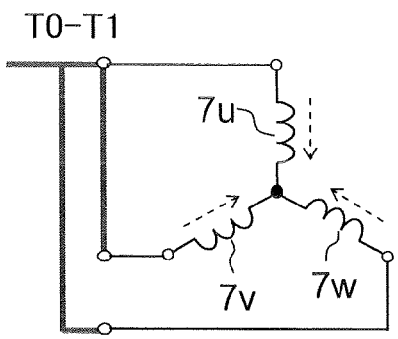
FIGS. 5A-5D are equivalent circuit diagrams of armature windings and a periphery thereof shown in FIG. 1 at each timing shown in FIG. 4.

A start timing of each carrier period, i.e., the timing when the carrier signal is a lowest level is referred to as T0. At the timing T0, the upper arms (8u, 8v and 8w) of the individual phases are turned on. In this case, as shown in FIG. 5A, a short circuit is formed so that current from or to the DC power supply 4 becomes zero. Therefore, the bus current becomes zero.

Figure 5B:
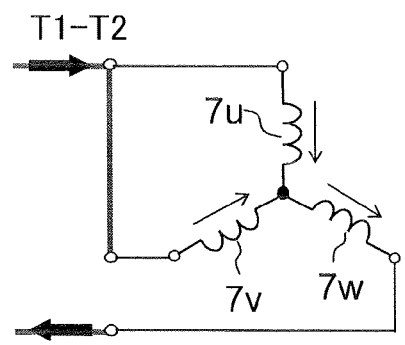

The inverter 2 refers to $v_u^*$, $v_v^*$ and $v_w^*$ so as to compare a voltage level of each phase voltage with the carrier signal. In the increasing process of a level of the carrier signal (voltage level), when a voltage level of the minimum phase crosses the carrier signal at the timing T1, the lower arm of the minimum phase is turned on. Then, as shown in FIG. 5B, current of the minimum phase flows as the bus current. In the example shown in FIG. 4, the lower arm 9w of the W-phase is in the turned-on state during the period from the timing T1 to a timing T2 that will be described later. Therefore, the W-phase current (having negative polarity) flows as the bus current.

Figure 5C:
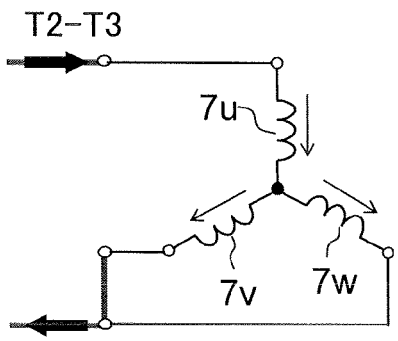

Further when a level of the carrier signal increases and reaches the timing T2 when a voltage level of the intermediate phase crosses the carrier signal, the upper arm of the maximum phase is turned on, and the lower arms of the intermediate phase and the minimum phase are turned on. Therefore, as shown in FIG. 5C, current of the maximum phase flows as the bus current. In the example shown in FIG. 4, the upper arm 8u of the U-phase is in the turned-on state, and the lower arms 9v and 9w of the V-phase and the W-phase are turned on in the period from the timing T2 to a timing T3 that will be described later. Therefore, the U-phase current (having positive polarity) flows as the bus current.

Figure 5D:
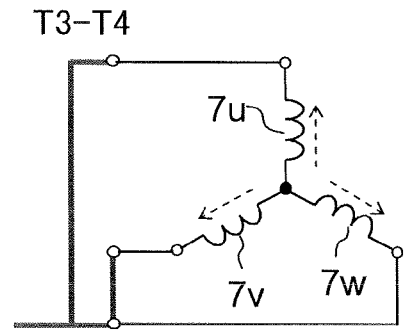

Further when a level of the carrier signal increases and reaches the timing T3 when a voltage level of the maximum phase crosses the carrier signal, the lower arms of all phases are turned on. Therefore, as shown in FIG. 5D, a short circuit is formed so that current from or to the DC power supply 4 becomes zero. Therefore, the bus current becomes zero.

At a middle timing between the timing T3 and a timing T4 that will be described later, the carrier signal reaches the maximum level, and then a level of the carrier signal decreases. In the decreasing process of a level of the carrier signal, the states as shown in FIGS. 5D, 5C, 5B and 5A appear one by one in this order. More specifically, in the decreasing process of a level of the carrier signal, it is supposed that a voltage level of the maximum phase crosses the carrier signal at the timing T4, a voltage level of the intermediate phase crosses the carrier signal at a timing T5, a voltage level of the minimum phase crosses the carrier signal at a timing T6, and a next carrier period starts at a timing T7. Then, the period between the timing T4 and the timing T5, the period between the timing T5 and the timing T6, the period between the timing T6 and the timing T7 have the same energizing patterns as the period T2-T3, the period T1-T2 and the period T0-T1, respectively.

Therefore, if the bus current is sensed in the period T1-T2 or T5-T6, the minimum phase current can be detected from the bus current. If the bus current is sensed in the period T2-T3 or T4-T5, the maximum phase current can be detected from the bus current. Then, the intermediate phase current can be obtained by calculation utilizing the fact that a sum of the three phase current values becomes zero. The fourth column in the table shown in FIG. 3 indicates a phase of current that flows as the bus current in each energizing pattern with a polarity of the current. For example, in the energizing pattern "HHL" corresponding to the eighth row in the table shown in FIG. 3, the W-phase current (having negative polarity) flows as the bus current.

Furthermore, the period obtained by removing the period between the timing T1 and the timing T6 from the carrier period indicates a pulse width of the PWM signal for the minimum phase. The period obtained by removing the period between the timing T2 and the timing T5 from the carrier period indicates a pulse width of the PWM signal for the intermediate phase. The period obtained by removing the period between the timing T3 and the timing T4 from the carrier period indicates a pulse width of the PWM signal for the maximum phase.

Although the above description exemplifies the case where the U-phase is the maximum phase and the W-phase is the minimum phase, there are six combinations of the maximum phase, the intermediate phase and the minimum phase. FIG. 6 shows the combinations as a table. When the U-phase voltage, the V-phase voltage and the W-phase voltage are denoted by $v_u$, $v_v$, and $v_w$, respectively, the state that satisfies "$v_u>v_v>v_w$" is referred to as a first mode, the state that satisfies "$v_v>v_u>v_w$" is referred to as a second mode, the state that satisfies "$v_v>v_w>v_u$" is referred to as a third mode, the state that satisfies "$v_w>v_v>v_u$" is referred to as a fourth mode, the state that satisfies "$v_w>v_u>v_v$" is referred to as a fifth mode, and the state that satisfies "$v_u>v_w>v_v$" is referred to as a sixth mode. The examples shown in FIGS. 4 and 5A-5D correspond to the first mode. In addition, FIG. 6 also indicates a phase of current sensed in each mode.

The specified U-phase voltage value $v_u^*$, the specified V-phase voltage value $v_v^*$ and the specified W-phase voltage value $v_w^*$ are specifically shown as set values of counter CntU, CntV and CntW, respectively. A larger set value is assigned to a higher phase voltage. For example, "CntU>CntV>CntW" holds in the first mode.

The counter (not shown) that is provided to the controller 3 increments its count value from zero every carrier period with reference to the timing T0. When the count value reaches CntW, the state in which the upper arm 8w of the W-phase is turned on is switched to the state in which the lower arm 9w is turned on. When the count value reaches CntV, the state in which the upper arm 8v of the V-phase is turned on is switched to the state in which the lower arm 9v is turned on. When the count value reaches CntU, the state in which the upper arm 8u of the U-phase is turned on is switched to the state in which the lower arm 9u is turned on. After the carrier signal reached the maximum level, the count value is decremented so that the switching action is performed reversely.

Therefore, in the first mode, the timing when the above-mentioned counter value reaches CntW corresponds to the timing T1. The timing when it reaches CntV corresponds to the timing T2. The timing when it reaches CntU corresponds to the timing T3. For this reason, in the first mode, while the counter value is incremented, the output signal of the current sensor 5 is sampled at a timing when the counter value is larger than CntW and is smaller than CntV, so that the W-phase current (having negative polarity) flowing as the bus current can be detected. Furthermore, the output signal of the current sensor 5 is sampled at a timing when the counter value is larger than CntV and is smaller than CntU, so that the U-phase current (having positive polarity) flowing as the bus current can be detected.

In the same manner, as shown in FIG. 6, in the second mode, the timing when the above-mentioned counter value reaches CntW corresponds to the timing T1. The timing when it reaches CntU corresponds to the timing T2. The timing when it reaches CntV corresponds to the timing T3. For this reason, in the second mode, while the counter value is incremented, the W-phase current (having negative polarity) can be detected from the bus current at the timing when the counter value is larger than CntW and is smaller than CntU. The V-phase current (having positive polarity) can be detected from the bus current at the timing when the counter value is larger than CntU and is smaller than CntV Ditto for the third to the sixth modes.

In addition, sampling timing for sensing phase current of the minimum phase in the period T1-T2 (e.g., mid-term between the timing T1 and the timing T2) is denoted by ST1, and sampling timing for sensing phase current of the maximum phase in the period T2-T3 (e.g., mid-term between the timing T2 and the timing T3) is denoted by ST2.

Note that pulse width (and duty) of the PWM signal for each phase is specified by the set values CntU, CnuV and CntW of the counter as the specified three-phase voltage value ($v_u^*$, $v_v^*$ and $v_w^*$).

When each phase current is detected from the bus current based on the above-mentioned principle, as understood from FIG. 4, if the voltage levels of the maximum phase and the intermediate phase approach each other for example, a time length between the period T2-T3 and the period T4-T5 becomes short. When the bus current is detected by converting an analog output signal from the current sensor 5 shown in FIG. 1 into a digital signal, if this time length is extremely short, necessary time for A/D conversion or a converging time for a ringing (a current ripple that is caused by the switching) cannot be secured. As a result, phase current of the maximum phase cannot be sensed. In the same manner, if the voltage levels of the minimum phase and the intermediate phase approach each other, phase current of the minimum phase cannot be sensed. If the current values of two phases cannot be measured, phase current of three phases cannot be reproduced. As a result, a vector control of the motor 1 cannot be performed.

In the present embodiment (examples that will be described later), during the period while such current values of two phases cannot be measured, orthogonal biaxial components of current supplied to the motor 1 (e.g., d-axis current and q-axis current that will be described later) are estimated so that the vector control of the motor 1 can be continued by using the estimated current. As a method for this estimation, first to fourth estimating methods are exemplified as follows. In addition, the period in which current values of two phases cannot be measured is referred to as an "immeasurable period", while the period in which current values of two phases can be measured is referred to as a "measurable period".

Figure 7:
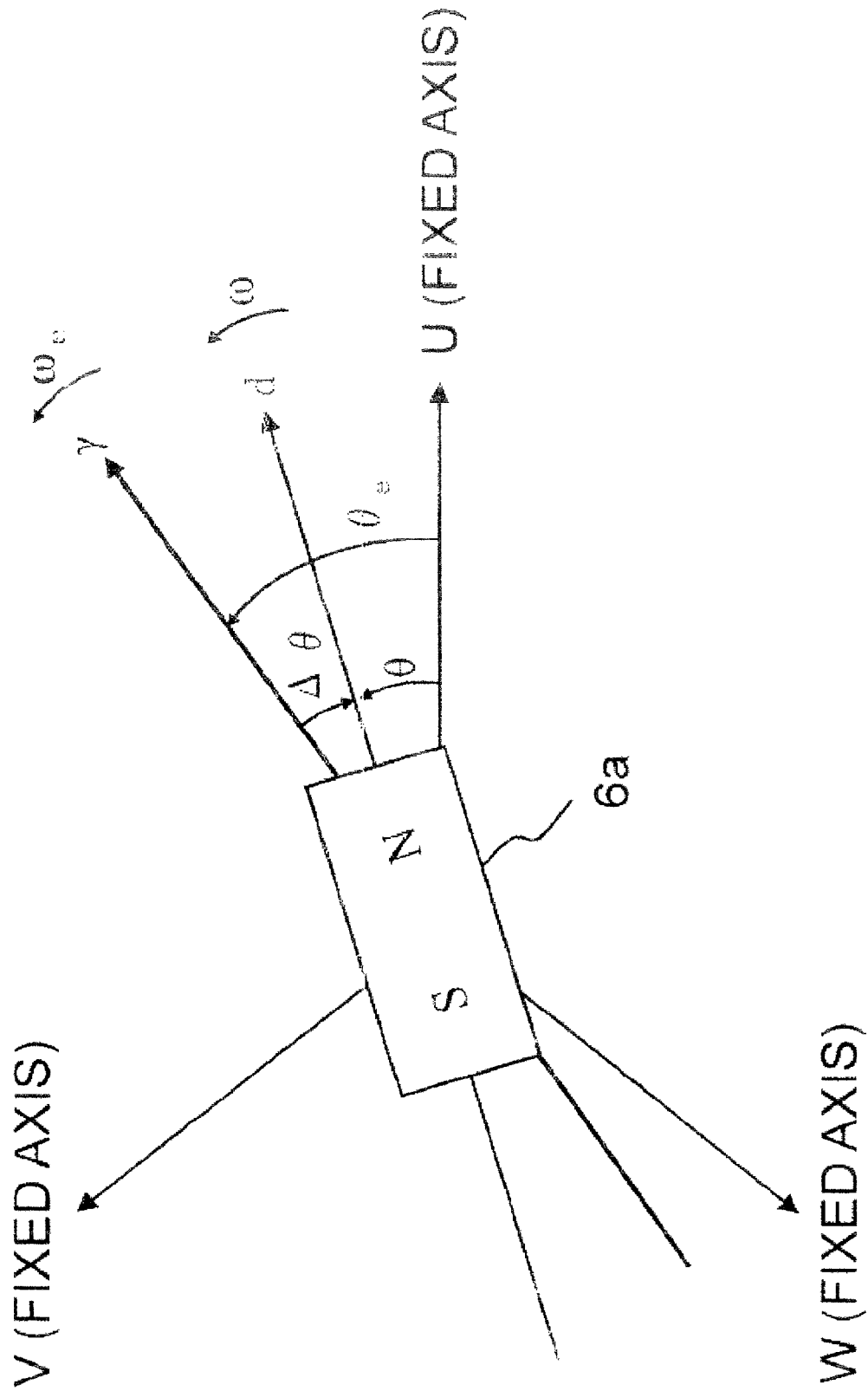
FIG. 7 is an analytic model diagram of the motor shown in FIG. 1.

Before description of each estimating method, various kinds of state quantities (state variables) will be described and defined. FIG. 7 is an analytic model diagram of the motor 1. FIG. 7 shows armature winding fixed axes of the U-phase, the V-phase and the W-phase (hereinafter, these may be simply referred to as a U-phase axis, a V-phase axis and a W-phase axis). Numeral 6a is a permanent magnet that is provided to the rotor 6 of the motor 1. In a rotating coordinate system that rotates at the same speed as magnetic flux generated by the permanent magnet 6a, a direction of the magnetic flux generated by the permanent magnet 6a is regarded as the d-axis. Although it is not illustrated, the phase that leads the d-axis by 90 degrees of electrical angle is regarded as the q-axis.

In addition, if a position sensor for detecting a rotor position is not used for performing the vector control on the motor 1, estimated axes for control are defined because the real d-axis and q-axis are unknown. A γ-axis is defined as the estimated axis for control corresponding to the d-axis, and a δ-axis is defined as the estimated axis for control corresponding to the q-axis. The δ-axis is an axis leading from the γ-axis by 90 degrees of electrical angle (not shown in FIG. 7). Usually, the vector control is performed so that the γ-axis and the δ-axis match the d-axis and the q-axis, respectively. The d-axis and the q-axis are the coordinate axes in the actual rotating coordinate system, and the coordinate that selects them as the coordinate axes is referred to as a dq coordinate. The γ-axis and the δ-axis are coordinate axes in the rotating coordinate system for control (estimated rotating coordinate system), and the coordinate that selects them as the coordinate axes is referred to as a γδ coordinate.

The d-axis (and the q-axis) is rotating, and its rotation speed (electrical angle speed) is referred to as an actual motor speed ω. The γ-axis (and δ-axis) is also rotating, and its rotation speed (electrical angle speed) is referred to as an estimated motor speed $ω_e$. In addition, as to the rotating dq coordinate at a moment, a phase of the d-axis is expressed by θ (actual rotor position θ) with reference to the armature winding fixed axis of the U-phase. In the same manner, as to the rotating γδ coordinate at a moment, a phase of the γ-axis is expressed by $θ_e$ (estimated rotor position $θ_e$) with reference to the armature winding fixed axis of the U-phase. Then, an axial error Δθ between the d-axis and the γ-axis is expressed by "$Δθ=θ-θ_e$".

In addition, a whole motor voltage that is applied to the motor 1 from the inverter 2 is denoted by $V_a$, while a whole motor current that is supplied to the motor 1 from the inverter 2 is denoted by $I_a$. Then, a γ-axis component, a δ-axis component, a d-axis component and a q-axis component of the motor voltage $V_a$ are expressed as a γ-axis voltage $v_γ$, a δ-axis voltage $v_δ$, a d-axis voltage $v_d$ and a q-axis voltage $v_q$, respectively. Further, a γ-axis component, a δ-axis component, a d-axis component and a q-axis component of the motor current $I_a$ are expressed as a γ-axis current $i_γ$, a δ-axis current $i_δ$, a d-axis current $i_d$ and a q-axis current $i_q$, respectively.

Reference $R_a$ denotes motor resistance (a resistance value of one phase of the armature winding of the motor 1). References $L_d$ and $L_q$ denote d-axis inductance (a d-axis component of inductance of the armature winding of the motor 1) and q-axis inductance (a q-axis component of inductance of the armature winding of the motor 1), respectively. Reference $\Phi_a$ is armature flux linkage due to the permanent magnet 1a.

Note that $L_d$, $L_q$, $R_a$ and $\Phi_a$ have values that are determined when the motor driving system is manufactured, and the values are used for calculation in the motor driving system. In addition, s means the Laplace operator while p means the differential operator in equations that will appear later in this description.

[First Estimating Method]

The first estimating method will be described. The first estimating method is used in the case where a position sensor for detecting rotor position is used so that a position (phase) of the rotor 6 is measured.

First, as a voltage equation of a permanent magnet synchronous motor, the equation (1-1) as described below is known. The equation (1-1) is deformed, and the equation (1-2) is obtained as below.

$$\begin{bmatrix} v_d \\ v_q \end{bmatrix} = \begin{bmatrix} R_a + pL_d & -\omega L_q \\ \omega L_d & R_a + pL_q \end{bmatrix} \begin{bmatrix} i_d \\ i_q \end{bmatrix} + \begin{bmatrix} 0 \\ \omega \Phi_a \end{bmatrix} \quad (1\text{-}1)$$

$$p\begin{bmatrix} i_d \\ i_q \end{bmatrix} = \begin{bmatrix} -R_a/L_d & \omega L_q/L_d \\ -\omega L_d/L_q & -R_a/L_q \end{bmatrix} \begin{bmatrix} i_d \\ i_q \end{bmatrix} + \begin{bmatrix} v_d/L_d \\ v_q/L_q \end{bmatrix} - \frac{1}{L_q}\begin{bmatrix} 0 \\ \omega \Phi_a \end{bmatrix} \quad (1\text{-}2)$$

When it is digitized at a sampling period $T_S$, difference equation (1-3) as below is obtained from the equation (1-2). Then, the equations (1-4) and (1-5) are obtained from the equation (1-3).

$$\frac{1}{T_s}\begin{bmatrix} i_d(k+1) - i_d(k) \\ i_q(k+1) - i_q(k) \end{bmatrix} = \begin{bmatrix} -R_a/L_d & \omega L_q/L_d \\ -\omega L_d/L_q & -R_a/L_q \end{bmatrix} \begin{bmatrix} i_d(k) \\ i_q(k) \end{bmatrix} + \begin{bmatrix} v_d(k)/L_d \\ v_q(k)/L_q \end{bmatrix} - \frac{1}{L_q}\begin{bmatrix} 0 \\ \omega \Phi_a \end{bmatrix} \quad (1\text{-}3)$$

$$i_d(k+1) = i_d(k) + \frac{v_d(k) + \omega L_q i_q(k) - R_a i_d(k)}{L_d/T_s} \quad (1\text{-}4)$$

$$i_q(k+1) = i_q(k) + \frac{v_q(k) - \omega \Phi_a - \omega L_d i_d(k) - R_a i_q(k)}{L_q/T_s} \quad (1\text{-}5)$$

In each of the equations (1-3) to (1-5) and other equations below in which $T_s$ appears, a parameter (k or k+1) inside the parentheses "()" indicates sampling timing in the case where digitization is performed at the sampling period $T_s$. The parameter k is a natural number, and (k+1) indicates sampling timing that comes next to k. For example, $i_d(k)$ and $i_q(k)$ denote $i_d$ and $i_q$ at k-th sampling timing, while $i_d(k+1)$ and $i_q(k+1)$ denote $i_d$ and $i_q$ at (k+1)th sampling timing. Ditto for other references except $i_d$ and $i_q$.

Note that the sampling period $T_S$ is an integer times the carrier period of the carrier signal (see FIG. 4). If the carrier period is $1/(10 \times 10^3)$ seconds, $T_S$ is set to a value of $1/(10 \times 10^3)$, $1/(5 \times 10^3)$ or $1/(2.5 \times 10^3)$ seconds, for example. In this way, it should be noted that the sampling timing related to the sampling period $T_S$ is different from the sampling timings ST1 and ST2 described above in the description of bus current sensing (see FIGS. 4 and 6).

As described later in the corresponding to example, the d-axis voltage $v_d$ and the q-axis voltage $v_q$ follow the specified d-axis voltage value $v_d^*$ and the specified q-axis voltage value $v_q^*$. Therefore, $v_d(k)$ and $v_q(k)$ in the equations (1-4) and (1-5) are replaced with $v_d^*(k)$ and $v_q^*(k)$, and further $\omega$ is replaced with $\omega(k)$, so that the equation (1-6) and (1-7) as below are obtained as estimation equation of the d-axis current $i_d$ and the q-axis current $i_q$. Signs $i_{de}$ and $i_{qe}$ denote estimated $i_d$ and $i_q$, and they are referred to as estimated d-axis current and estimated q-axis current, respectively.

$$i_{de}(k+1) = i_d(k) + \frac{v_d*(k) + \omega(k)L_q i_q(k) - R_a i_d(k)}{L_d/T_s} \quad (1\text{-}6)$$

$$i_{qe}(k+1) = i_q(k) + \frac{v_q*(k) - \omega(k)\Phi_a - \omega(k)L_d i_d(k) - R_a i_q(k)}{L_q/T_s} \quad (1\text{-}7)$$

In the first estimating method, during the "immeasurable period" in which current values of two phases cannot be measured, the estimated d-axis current $i_{de}$ and the estimated q-axis current $i_{qe}$ are calculated based on the equation (1-6) and the equation (1-7) so that the d-axis current and the q-axis current at the next sampling timing are estimated.

[Second Estimating Method]

Next, a second estimating method will be described. The second estimating method is used in the case where the position sensor for detecting rotor position is not used, i.e., a so-called sensorless control is performed. The second estimating method corresponds to a one in which the first estimating method is applied to the sensorless control.

First, as an extension induction voltage (extended electromotive force) equation of a permanent magnet synchronous motor, the equation (2-1) as below is known. $E_{ex}$ in the equation (2-1) is usually called an extension induction voltage (extended electromotive force), and it is expresses by the equation (2-2).

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (2\text{-}1)$$

$$E_{ex} = \omega\Phi_a + \omega(L_d - L_q)i_d - (L_d - L_q)(pi_q) \quad (2\text{-}2)$$

The above-mentioned equations (2-1) and (2-2) are known to be expressed by the equations (2-3) and (2-4) in the $\gamma\delta$ coordinate system that is the estimated coordinate system (note that the equation (2-2) and the equation (2-4) are the same equation).

$$\begin{bmatrix} v_\gamma \\ v_\delta \end{bmatrix} = \begin{bmatrix} R_a + pL_d & -\omega L_q \\ \omega L_q & R_a + pL_d \end{bmatrix} \begin{bmatrix} i_\gamma \\ i_\delta \end{bmatrix} + E_{ex}\begin{bmatrix} -\sin\Delta\theta \\ \cos\Delta\theta \end{bmatrix} \quad (2\text{-}3)$$

$$E_{ex} = \omega\Phi_a + \omega(L_d - L_q)i_d - (L_d - L_q)(pi_q) \quad (2\text{-}4)$$

Then, the equation (2-3) is deformed so that the equation (2-5) as below is obtained. Here, $E_{ex\gamma}$ and $E_{ex\delta}$ are a $\gamma$-axis component and a $\delta$-axis component of $E_{ex}$, respectively.

$$p\begin{bmatrix} i_\gamma \\ i_\delta \end{bmatrix} = \frac{1}{L_d}\begin{bmatrix} -R_a/L_d & \omega L_q/L_d \\ -\omega L_q/L_d & -R_a/L_d \end{bmatrix} \begin{bmatrix} i_\gamma \\ i_\delta \end{bmatrix} + \frac{1}{L_d}\begin{bmatrix} v_d \\ v_q \end{bmatrix} - \frac{1}{L_d}\begin{bmatrix} E_{ex\gamma} \\ E_{ex\delta} \end{bmatrix} \quad (2\text{-}5)$$

In the same manner as the first estimating method, they are digitized at the sampling period $T_S$, and it is supposed that $\omega = \omega_e(k)$, $E_{ex\gamma} = E_{ex\gamma}(k)$, $E_{ex\delta} = E_{ex\delta}(k)$, $v_\gamma(k) = v_\gamma^*(k)$, and $v_\delta(k) = v_\delta^*(k)$. Then, the equation (2-6) and the equation (2-7) as below for estimating current at the next sampling timing are obtained from the equation (2-5). Signs $i_{\gamma e}$ and $i_{\delta e}$ are estimated $i_\gamma$ and $i_\delta$, and they are referred to as an estimated $\gamma$-axis current and an estimated $\delta$-axis current, respectively.

Note that signs $E_{ex\gamma}$ and $E_{ex\delta}$ in the equation (2-6) and the equation (2-7) are estimated values of a γ-axis component and a δ-axis component of the extension induction voltage (extended electromotive force) $E_{ex}$. Although they are different from their true values, they are regarded to be the same as them on the assumption that an error between the estimated value and the true value is small.

$$i_{\gamma e}(k+1) = i_\gamma(k) + \frac{v_\gamma^*(k) - E_{ex\gamma}(k) + \omega_e(k)L_q i_\delta(k) - R_a i_\gamma(k)}{L_d/T_s} \quad (2\text{-}6)$$

$$i_{\delta e}(k+1) = i_\delta(k) + \frac{v_\delta^*(k) - E_{ex\delta}(k) - \omega_e(k)L_q i_\gamma(k) - R_a i_\delta(k)}{L_d/T_s} \quad (2\text{-}7)$$

[Third Estimating Method]

Next, the third estimating method will be described. The third estimating method is used in the case where the position sensor for detecting rotor position is used for measuring a position (phase) of the rotor 6.

In a system having a plurality of state variables, each state variable may be interfered by other state variables. If such interference exists, control becomes complicated so that control characteristics of the entire system may be deteriorated. The control for eliminating such interference between different state variables is called a decoupling control (in other words, non-interference control), which is usually used for a current control of a motor. Furthermore, it is known conventionally and generally that if the decoupling control is applied to a current control of the motor 1, current response can be approximated to a first order lag. It is described in "Practical theory and design of AC servo system" by Sugimoto and two others, SOGO DENSHI SHUPPANSHA, January 1990, pp. 80-85, for example.

The fact that the current response can be approximated to the first order lag will be described briefly, and then the third estimating method utilizing characteristics of the first order lag will be described. A case will be considered, in which the decoupling control (decoupling current control) that is expressed by the equations (3-1) and (3-2) as below is performed. It is supposed that current controls with respect to $i_d$ and $i_q$ are proportional-plus-integral controls.

$$v_d^* = v_d = v_d' - \omega L_q i_q = K_{id}\left(1 + \frac{1}{T_{id}s}\right)(i_d^* - i_d) - \omega L_q i_q \quad (3\text{-}1)$$

$$\begin{aligned} v_q^* &= v_q \\ &= v_q' + \omega(L_d i_d + \Phi_a) \\ &= K_{iq}\left(1 + \frac{1}{T_{iq}s}\right)(i_q^* - i_q) + \omega(L_d i_d + \Phi_a) \end{aligned} \quad (3\text{-}2)$$

Here, $i_d^*$ is a specified d-axis current value that the d-axis current $i_d$ should follow, and $i_q^*$ is a specified q-axis current value that the q-axis current $i_q$ should follow. In addition, as to the equations (3-1) and (3-2), $v_d^*$ and $v_q^*$ are equal to $v_d$ and $v_q$, respectively. $K_{id}$ is a proportional factor (proportional gain) of the proportional-plus-integral control with respect to the d-axis current, and $T_{id}$ is an integral time of the proportional-plus-integral control with respect to the d-axis current. $K_{iq}$ is a proportional factor (proportional gain) of the proportional-plus-integral control with respect to the q-axis current, and $T_{iq}$ is integral time of the proportional-plus-integral control with respect to the q-axis current.

When the decoupling control as expressed by the equations (3-1) and (3-2) is performed, it is understood that the above-mentioned equation (1-2) is deformed into the equation (3-3) as below, in which interference between the d-axis and the q-axis is eliminated.

$$p\begin{bmatrix} i_d \\ i_q \end{bmatrix} = \begin{bmatrix} -R_a/L_d & 0 \\ 0 & -R_a/L_q \end{bmatrix}\begin{bmatrix} i_d \\ i_q \end{bmatrix} + \begin{bmatrix} v_d'/L_d \\ v_q'/L_q \end{bmatrix} \quad (3\text{-}3)$$

The integral time is set to a value such that expressions "$T_{id}=L_d/R_a$" and "$T_{iq}=L_q/R_a$" are satisfied. Then, an open loop transfer function $G^o_{id}(s)$ of an $i_d$ control system and an open loop transfer function $G^o_{iq}(s)$ of an $i_q$ control system are expressed by the equations (3-4) and (3-5) as below, which become merely integral control elements.

$$G^o_{id}(s) = \frac{T_{id}s+1}{T_{id}s} \cdot \frac{\frac{K_{id}}{R_a}}{\frac{L_d}{R_a}s+1} = \frac{1}{\frac{L_d}{K_{id}}s} \quad (3\text{-}4)$$

$$G^o_{iq}(s) = \frac{T_{iq}s+1}{T_{iq}s} \cdot \frac{\frac{K_{iq}}{R_a}}{\frac{L_q}{R_a}s+1} = \frac{1}{\frac{L_q}{K_{iq}}s} \quad (3\text{-}5)$$

Then, a closed loop transfer function $G^c_{id}(s)$ of the $i_d$ control system and a closed loop transfer function $G^c_{iq}(s)$ of the $i_q$ control system are expressed by the equations equation (3-6) and (3-7) as below. In other words, the transfer function of the current control becomes a first order lag.

$$G^c_{id}(s) = \frac{1}{\frac{L_d}{K_{id}}s+1} \quad (3\text{-}6)$$

$$G^c_{iq}(s) = \frac{1}{\frac{L_q}{K_{iq}}s+1} \quad (3\text{-}7)$$

In the third estimating method, it is assumed that the transfer function of the current control is a first order lag, and the time constants $T_d(=L_d/K_{id})$ and $T_q(=L_q/K_{iq})$ of a current control system are considered, in order to estimate the d-axis current $i_d$ and the q-axis current $i_q$. More specifically, during the "immeasurable period" in which current values of two phases cannot be measured, the estimated d-axis current $i_{de}$ and the estimated q-axis current $i_{qe}$ that are digitized are calculated based on the equation (3-8) and the equation (3-9).

$$i_{de}(k+1) = \frac{T_d}{T_s+T_d}i_d(k) + \frac{T_s}{T_s+T_d}i_d*(k+1) \quad (3\text{-}8)$$

$$i_{qe}(k+1) = \frac{T_q}{T_s+T_q}i_q(k) + \frac{T_s}{T_s+T_q}i_q*(k+1) \quad (3\text{-}9)$$

[Fourth Estimating Method]

Next, the fourth estimating method will be described. The fourth estimating method is used in the case where the position sensor for detecting rotor position is not used, i.e., the case where a so-called sensorless control is performed. The fourth estimating method corresponds to a one in which the third estimating method is applied to the sensorless control.

It is considered a case where the decoupling control (decoupling current control) that is expressed by the equation (4-1) and the equation (4-2) as below is performed. It is supposed that current controls with respect to $i_\gamma$ and $i_\delta$ are proportional-plus-integral controls.

$$v_\gamma^* = v_\gamma \qquad (4-1)$$
$$= v_\gamma' - \omega_e L_q i_\delta + E_{ex\gamma}$$
$$= K_{i\gamma}\left(1 + \frac{1}{T_{id}s}\right)(i_\gamma^* - i_\gamma) - \omega_e L_q i_\delta + E_{ex\gamma}$$

$$v_\delta^* = v_\delta \qquad (4-2)$$
$$= v_\delta' + \omega_e L_q i_\gamma + E_{ex\delta}$$
$$= K_{i\delta}\left(1 + \frac{1}{T_{id}s}\right)(i_\delta^* - i_\delta) + \omega_e L_q i_\gamma + E_{ex\delta}$$

Here, $i_\gamma^*$ is a specified δ-axis current value that the γ-axis current $i_\gamma$ should follow, and $i_\delta^*$ is a specified δ-axis current value that the δ-axis current $i_\delta$ should follow. In addition, as to the equation (4-1) and the equation (4-2), $v_\gamma^*$ and $v_\delta^*$ are equal to $v_\gamma$ and $v_\delta$, respectively. $K_{i\gamma}$ is a proportional factor (proportional gain) of the proportional-plus-integral control with respect to the γ-axis current, and $K_{i\delta}$ is a proportional factor (proportional gain) of the proportional-plus-integral control with respect to the δ-axis current. $T_{id}$ is integral time of the proportional-plus-integral control.

$E_{ex\gamma}$ and $E_{ex\delta}$ in the equation (4-1) and the equation (4-2) are estimated values of the γ-axis component and the δ-axis component of the extension induction voltage (extended electromotive force) $E_{ex}$. Although they are different from their true values, they are regarded to be the same as them assuming that an error between the estimated value and the true value is small. Further, if it is assumed that $\omega \approx \omega_e$, the above-mentioned equation (2-5) is deformed into the equation (4-3) as below, in which the interference between the γ-axis and the δ-axis is eliminated.

$$p\begin{bmatrix}i_\gamma \\ i_\delta\end{bmatrix} = \begin{bmatrix}-R_a/L_d & 0 \\ 0 & -R_a/L_d\end{bmatrix}\begin{bmatrix}i_\gamma \\ i_\delta\end{bmatrix} + \frac{1}{L_d}\begin{bmatrix}v_\gamma \\ v_\delta\end{bmatrix} \qquad (4-3)$$

When the integral time is set to a value such that "$T_{id}=L_d/R_a$" is satisfied, an open loop transfer function $G^o{}_{i\gamma}(s)$ of an $i_\gamma$ control system and an open loop transfer function $G^o{}_{i\delta}(s)$ of an iδ control system are expressed by the equation (4-4) and the equation (4-5) as below, and they become merely integral control elements.

$$G^o_{i\gamma}(s) = \frac{T_{id}s+1}{T_{id}s} \cdot \frac{\frac{K_{i\gamma}}{R_a}}{\frac{L_d}{R_a}s+1} = \frac{1}{\frac{L_d}{K_{i\gamma}}s} \qquad (4-4)$$

$$G^o_{i\delta}(s) = \frac{T_{id}s+1}{T_{id}s} \cdot \frac{\frac{K_{i\delta}}{R_a}}{\frac{L_d}{R_a}s+1} = \frac{1}{\frac{L_d}{K_{i\delta}}s} \qquad (4-5)$$

Then, the closed loop transfer function $G^c{}_{i\gamma}(s)$ of the $i_\gamma$ control system and the closed loop transfer function $G^c{}_{i\delta}(s)$ of the is control system are expressed by the equation (4-6) and the equation (4-7) as below. In other words, the transfer function of the current control becomes a first order lag.

$$G^c_{i\gamma}(s) = \frac{1}{\frac{L_d}{K_{i\gamma}}s+1} \qquad (4-6)$$

$$G^c_{i\delta}(s) = \frac{1}{\frac{L_d}{K_{i\delta}}s+1} \qquad (4-7)$$

In the fourth estimating method, it is assumed that the transfer function of the current control is a first order lag, and time constants $T_\gamma(=L_d/K_{i\gamma})$ and $T_\delta(=L_d/K_{i\delta})$ of the current control system are considered, in order to estimate the γ-axis current $i_\gamma$ and the δ-axis current $i_\delta$. More specifically, during the "immeasurable period" in which current values of two phases cannot be measured, the estimated γ-axis current $i_{\gamma e}$ and the estimated δ-axis current $i_{\delta e}$ that are digitized are calculated based on the equation (4-8) and the equation (4-9).

$$i_{\gamma e}(k+1) = \frac{T_\gamma}{T_s+T_\gamma}i_\gamma(k) + \frac{T_s}{T_s+T_\gamma}i_\gamma*(k+1) \qquad (4-8)$$

$$i_{\delta e}(k+1) = \frac{T_\delta}{T_s+T_\delta}i_\delta(k) + \frac{T_s}{T_s+T_\delta}i_\delta*(k+1) \qquad (4-9)$$

Hereinafter, each example that utilizes each of the estimating methods described above will be described. Note that described matters in a certain example (e.g., a first example) can also be applied to other examples as long as there is no contradiction.

First Example

Figure 8:
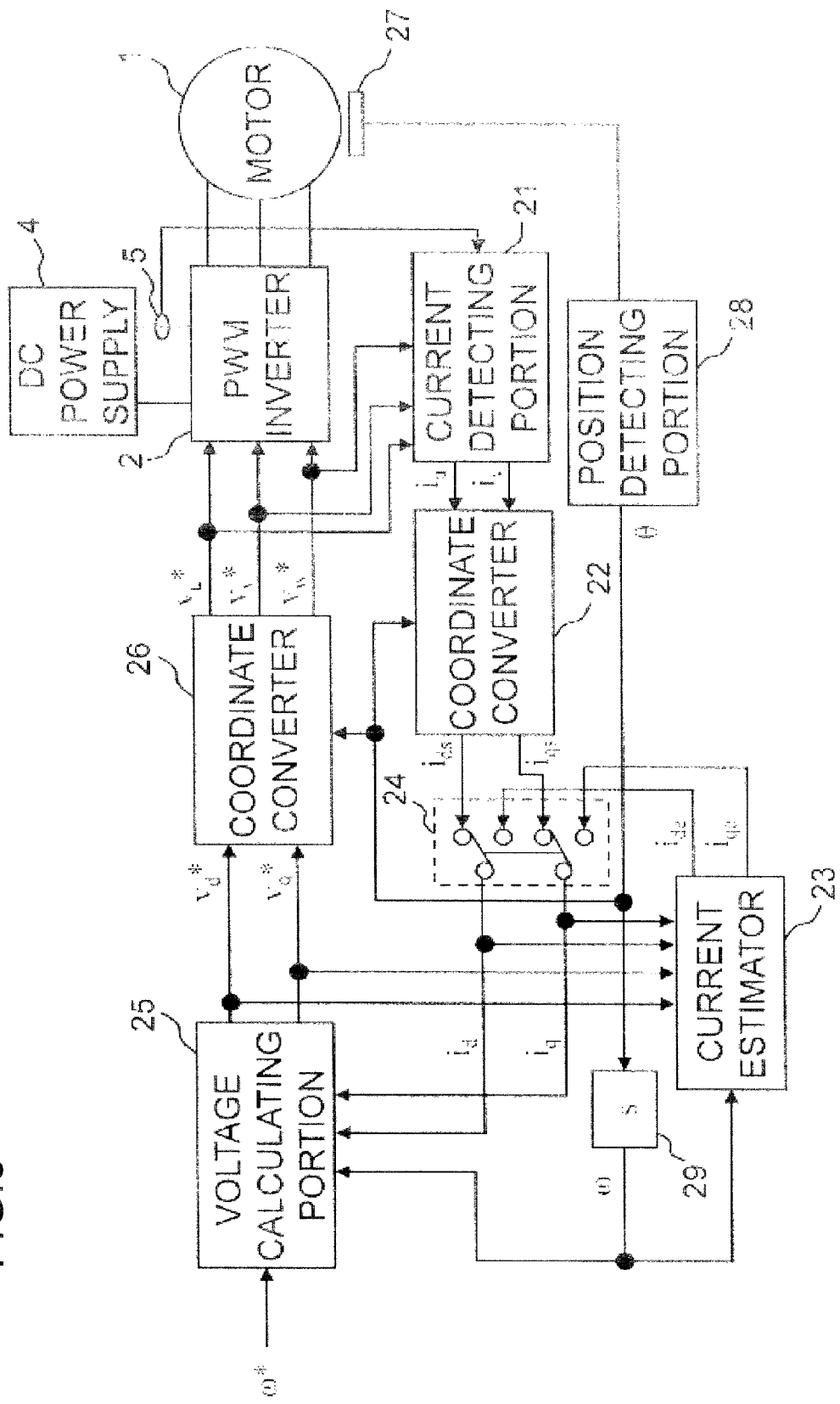
FIG. 8 is a block diagram of a general structure of a motor driving system according to a first example of the present invention.

First, a first example will be described. In the first example, the above-mentioned first estimating method is utilized. FIG. 8 is a block diagram of a general structure of a motor driving system according to the first example. In FIG. 8, the same parts as those shown in FIG. 1 are denoted by the same references.

The motor driving system shown in FIG. 8 includes a motor 1, an inverter 2, a DC power supply 4 and a current sensor 5. It also includes "a current detecting portion 21, a coordinate converter 22, a current estimator 23, a current switching portion 24, a voltage calculating portion 25, a coordinate converter 26, a position sensor 27, a position detecting portion 28 and a differentiator 29" that constitute the controller 3 shown in FIG. 1.

The position sensor 27 is a rotary encoder or the like, which delivers a signal corresponding to an actual rotor position θ (phase) of the rotor 6 of the motor 1 to the position detecting portion 28. The position detecting portion 28 detects the actual rotor position θ based on the output signal of the position sensor 27. The differentiator 29 differentiates the actual rotor position θ so as to calculate the actual motor speed ω and deliver the same.

As described above, the current sensor 5 senses the bus current and delivers the signal that indicates a current value of the bus current. The current detecting portion 21 refers to the specified three-phase voltage values $v_u^*$, $v_v^*$ and $v_w^*$ delivered from the coordinate converter 26 in the "measurable period" in which current values of two phases can be measured, so as to specify which phases are the maximum phase, the intermediate phase and the minimum phase, respectively (i.e., specifies which one of the first to the sixth modes described above with reference to FIG. 6 a relationship among levels of the phase voltages belongs to). Then, based on the specified three-phase voltage values $v_u^*$, $v_v^*$ and $v_w^*$, it determines the timings ST1 and ST2 for sampling the output signal of the current sensor 5 (see FIG. 6), and it calculates the U-phase current $i_u$ and the V-phase current $i_v$ from the current value of the bus current obtained at the timings and delivers the same. In this case, a relational expression "$i_u + i_v + i_w = 0$" is used if necessary ($i_w$ is W-phase current).

The coordinate converter 22 refers to the actual rotor position θ so as to convert the U-phase current $i_u$ and the V-phase current $i_v$ into the d-axis current $i_d$ and the q-axis current $i_q$, respectively. In order to distinguish $i_d$ and $i_q$ obtained by this conversion from an output value of the current estimator 23, they are referred to as measured d-axis current and measured q-axis current and represented by $i_{ds}$ and $i_{qs}$, respectively. In other words, the coordinate converter 22 calculates the measured d-axis current $i_{ds}$ and the measured q-axis current $i_{qs}$, which are delivered to the current switching portion 24.

The current estimator 23 complies the above-mentioned first estimating method during the "immeasurable period" in which current values of two phases cannot be measured, so as to calculate the estimated d-axis current $i_{de}$ and the estimated q-axis current $i_{qe}$, which are delivered to the current switching portion 24.

Hereinafter, the measured d-axis current and the measured q-axis current are also referred to as measured current in a generic manner, while the estimated d-axis current and the estimated q-axis current are also referred to as estimated current in a generic manner.

The current switching portion 24 selects either one of the measured d-axis current $i_{ds}$ and the estimated d-axis current $i_{de}$ that are given and delivers it as the d-axis current $i_d$, and it also selects either one of the measured q-axis current $i_{qs}$ and the estimated q-axis current $i_{qe}$ that are given and delivers it as the q-axis current $i_q$. In the "measurable period", $i_{ds}$ and $i_{qs}$ are selected and delivered as $i_d$ and $i_q$, while $i_{de}$ and $i_{qe}$ are selected and delivered as $i_d$ and $i_q$ in the "immeasurable period".

It is determined whether the present time is in the "measurable period" or in the "immeasurable period" based on the specified three-phase voltage value, for example. More specifically, the set values CntU, CntV and CntW of the counters of the phases, which are indicated in the specified three-phase voltage value, are referred to (see FIG. 6). If an absolute value of a difference between a set value of the counter of the intermediate phase and a set value of the counter of the minimum phase is smaller than a predetermined threshold value $TH_1$, or if an absolute value of a difference between a set value of the counter of the maximum phase and a set value of the counter of the intermediate phase is smaller than the threshold value $TH_1$, it is decided to be the immeasurable period. Otherwise, it is decided to be the measurable period. For example, in the first mode, it is determined whether each of the inequalities "$|CntV - CntW| < TH_1$" and "$|CntU - CntV| < TH_1$" holds or doesn't hold. Then, if at least one of two inequalities holds, it is decided to be the immeasurable period, while it is decided to be the measurable period if each of the two inequalities doesn't hold.

Since the set values CntU, CnuV and CntW of the counters as the specified three-phase voltage values ($v_u^*$, $v_v^*$ and $v_w^*$) specify the pulse widths of PWM signals with respect to the individual phases, the above-mentioned comparison with the threshold value $TH_1$ using the above-mentioned two inequalities is equivalent to comparison of each of "a difference between a pulse width of the PWM signal with respect to the intermediate phase and a pulse width of the PWM signal with respect to the minimum phase" and "a difference between a pulse width of the PWM signal with respect to the maximum phase and a pulse width of the PWM signal with respect to the intermediate phase" with a predetermined pulse width threshold value. In other words, it can be expressed that it decides which of the measurable period and the immeasurable period the present time belongs to based on a relationship among pulse widths (duty factors) of PWM signals of the individual phases. This decision is performed by the current switching portion 24 (or a current switching portion 24a that will be described later), for example.

The voltage calculating portion 25 is externally supplied with a specified motor speed value ω* as a specified value for rotating the motor 1 (rotor 6) at a desired speed. In addition, the voltage calculating portion 25 is supplied with an actual motor speed ω from the differentiator 29 and is supplied with the d-axis current $i_d$ and the q-axis current $i_q$ from the current switching portion 24. The voltage calculating portion 25 calculates the specified q-axis current value $i_q^*$ that the q-axis current $i_q$ should follow based on a speed error (ω*−ω). For example, $i_q^*$ is calculated so that (ω*−ω) converges to zero by the proportional-plus-integral control. Further, the voltage calculating portion 25 refers to $i_q^*$ so as to calculate the specified d-axis current value $i_d^*$ that the d-axis current $i_d$ should follow. For example, it calculates $i_d^*$ for realizing a maximum torque control.

Then, the voltage calculating portion 25 calculates and delivers the specified d-axis voltage value $v_d^*$ that the d-axis voltage $v_d$ should follow and the specified q-axis voltage value $v_q^*$ that the q-axis voltage $v_q$ should follow, in accordance with the equation (3-1) and the equation (3-2) described above. Thus, the current errors ($i_d^*−i_d$) and ($i_q^*−i_q$) converge to zero.

The coordinate converter 26 refers to the actual rotor position θ from the position detecting portion 28 so as to convert $v_d^*$ and $v_q^*$ from the voltage calculating portion 25 into the specified three-phase voltage values ($v_u^*$, $v_v^*$ and $v_w^*$), which are delivered to the inverter 2. The inverter 2 supplies the three-phase AC current to the motor 1 in accordance with the specified three-phase voltage value as described above.

An operation of the current estimator 23 will be described in detail. In the first example, the above-mentioned first estimating method is used. The individual portions of the motor driving system shown in FIG. 8 update the individual values ($i_d$, $v_d^*$, ω (and the like) calculated in the motor driving system sequentially at the sampling period $T_S$.

The current estimator 23 calculates the estimated current based on $i_d$ and $i_q$ from the current switching portion 24, $v_d^*$ and $v_q^*$ from the voltage calculating portion 25, and ω from the differentiator 29. More specifically, the current estimator 23 calculates $i_{de}(k+1)$ and $i_{qe}(k+1)$ in accordance with the above-mentioned equations (1-6) and (1-7) in the immeasurable period after setting the previous $i_d$ and $i_q$ as $i_d(k)$ and $i_q(k)$, the previous $v_d^*$ and $v_q^*$ as $v_d^*(k)$ and $v_q^*(k)$, and the previous ω as ω(k), and it delivers the calculated $i_{de}(k+1)$ and $i_{qe}(k+1)$ as $i_{de}$ and $i_{qe}$ this time.

Just before changing from the measurable period to the immeasurable period, the current switching portion 24 delivers $i_d$ and $i_q$ based on the measured current ($i_{ds}$ and $i_{qs}$). For this reason, just after changing from the measurable period to the immeasurable period, $i_d$ and $i_q$ based on the measured current are used as $i_d(k)$ and $i_q(k)$ for calculating the estimated current ($i_{de}$ and $i_{qe}$). After that, if the immeasurable period continues, $i_d$ and $i_q$ based on the estimated current are delivered from the current switching portion 24. Therefore, calculation of the estimated current is continued by using $i_d$ and $i_q$ based on the estimated current as new $i_d(k)$ and $i_q(k)$.

If the current supplied to the motor 1 is regarded as a current vector on the rotating coordinate, $i_d$ and $i_q$ are orthogonal biaxial components (d-axis component and q-axis component) of the current vector, and the current vector is made up of the orthogonal biaxial components. In other words, the current estimator 23 estimates the current vector on the dq coordinate.

According to the first example, in the immeasurable period, the orthogonal biaxial components that form the current vector are estimated based on a past current value ($i_d$ and $i_q$) and the specified voltage value ($v_d^*$ and $v_q^*$). Thus, also in a transient state, the estimation of current can be performed accurately so that the vector control of the motor 1 can be performed appropriately. In addition, since correction of the pulse width of the PWM signal such that distortion occurs in the voltage is not performed, the motor 1 can be driven smoothly. For this reason, vibration and noise when the motor 1 is driven can be controlled to low levels.

Note that the specified voltage value is updated sequentially also in the immeasurable period. Therefore, if the motor current is estimated based on only the past current value, accuracy of the current estimation will be lowered in the transient state.

Second Example

Figure 9:
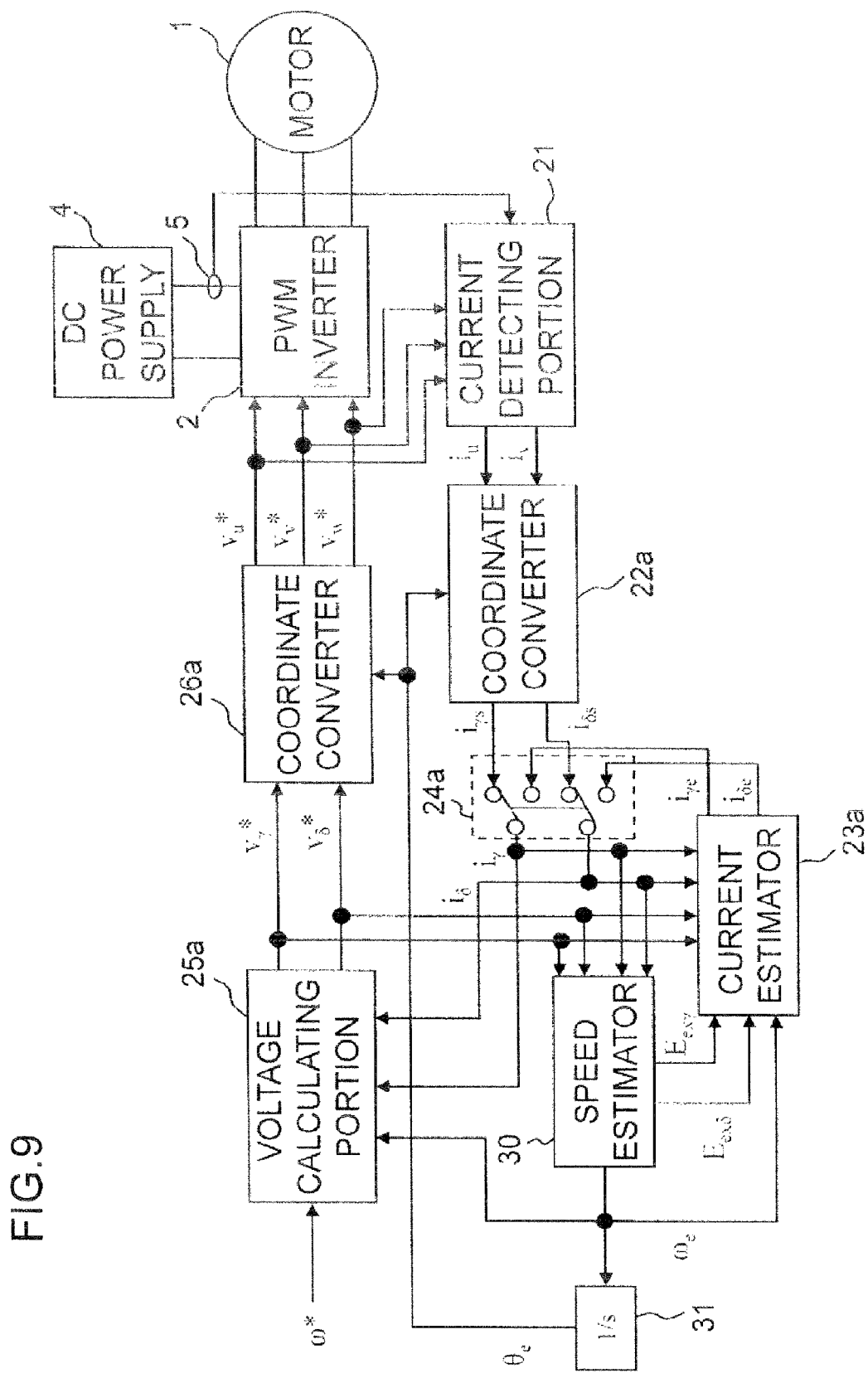
FIG. 9 is a block diagram of a general structure of a motor driving system according to a second example of the present invention.

Next, a second example will be described. In the second example, the above-mentioned second estimating method is utilized. FIG. 9 is a block diagram of a general structure of a motor driving system according to the second example. In FIG. 9, the same parts as FIGS. 1 and 8 are denoted by the same references. Overlapping description of the same part will be omitted.

The motor driving system shown in FIG. 9 includes a motor 1, an inverter 2, a DC power supply 4 and a current sensor 5. It also includes "a current detecting portion 21, a coordinate converter 22a, a current estimator 23a, a current switching portion 24a, a voltage calculating portion 25a, a coordinate converter 26a, a speed estimator 30 and integrator 31" that constitute the controller 3 shown in FIG. 1.

In the second example, a position sensor for detecting rotor position is not provided, and the estimated rotor position $\theta_e$ for a vector control of the motor 1 is calculated. For this reason, "d and q" in the first example are replaced with "γ and δ". In addition, the specified three-phase voltage value to which the current detecting portion 21 or the like refers is delivered from the coordinate converter 26a.

The coordinate converter 22a refers to the estimated rotor position $\theta_e$ so as to convert the U-phase current $i_u$ and the V-phase current $i_v$ from the current detecting portion 21 into the γ-axis current $i_\gamma$ and δ-axis current $i_\delta$, respectively. In order to distinguish $i_\gamma$ and $i_\delta$ obtained by this conversion from an output value of the current estimator 23a, they are referred to as measured γ-axis current and a measured δ-axis current, respectively, and they are denoted by $i_{\gamma s}$ and $i_{\delta s}$, respectively. In other words, the coordinate converter 22a calculates the measured γ-axis current $i_{\gamma s}$ and the measured δ-axis current $i_{\delta s}$, which are delivered to the current switching portion 24a.

The current estimator 23a complies the above-mentioned second estimating method during the "immeasurable period" in which current values of two phases cannot be measured so as to calculate the estimated γ-axis current $i_{\gamma e}$ and the estimated δ-axis current $i_{\delta e}$, which are delivered to the current switching portion 24a.

Hereinafter, the measured γ-axis current and the measured δ-axis current may be referred to as measured current in a generic manner, while the estimated γ-axis current and the estimated δ-axis current may be referred to as estimated current in a generic manner.

The current switching portion 24a selects either one of the given measured γ-axis current $i_{\gamma s}$ and estimated γ-axis current $i_{\gamma e}$ and delivers it as the γ-axis current $i_\gamma$. It also selects either one of the given measured δ-axis current $i_{\delta s}$, and estimated δ-axis current $i_{\delta e}$ and delivers it as the δ-axis current $i_\delta$. In the "measurable period", $i_{\gamma s}$ and $i_{\delta s}$ are selected and delivered as $i_\gamma$ and $i_\delta$, while $i_{\gamma e}$ and $i_{\delta e}$ are selected and delivered as $i_\gamma$ and is in the "immeasurable period". It is possible to adopt the same method for deciding whether it is the measurable period or the immeasurable period as described in the first example.

The voltage calculating portion 25a is supplied externally with a specified motor speed value $\omega^*$ as a specified value for rotating the motor 1 (rotor 6) at a desired speed. In addition, the voltage calculating portion 25a is supplied with the estimated motor speed $\omega_e$ from the speed estimator 30 and is supplied with the γ-axis current $i_\gamma$ and the δ-axis current $i_\delta$ from the current switching portion 24a. The voltage calculating portion 25a calculates the specified δ-axis current value $i_\delta^*$ that the δ-axis current $i_\delta$ should follow, based on a speed error ($\omega^*-\omega_e$). For example, $i_\delta^*$ is calculated so that ($\omega^*-\omega_e$) is converged to zero by the proportional-plus-integral control. Furthermore, the voltage calculating portion 25a refers to $i_\delta^*$ so as to calculates the specified γ-axis current value $i_\gamma^*$ that the γ-axis current $i_\gamma$ should follow. For example, it calculates $i_\gamma^*$ for realizing the maximum torque control.

Then, the voltage calculating portion 25a calculates and delivers the specified γ-axis voltage value $v_\gamma^*$ that the γ-axis voltage $v_\gamma$ should follow and the specified δ-axis voltage value $v_\delta^*$ that the δ-axis voltage $v_\delta$ should follow, in accordance with the above-mentioned equation (4-1) and the equation (4-2). Thus, the current errors ($i_\gamma^*-i_\gamma$) and ($i_\delta^*-i_\delta$) are converged to zero.

The coordinate converter 26a refers to the estimated rotor position $\theta_e$ from the integrator 31 so as to convert $v_\gamma^*$ and $v_\delta^*$ from the voltage calculating portion 25a into the specified three-phase voltage values ($v_u^*$, $v_v^*$ and $v_w^*$), and it delivers the specified three-phase voltage values to the inverter 2. The inverter 2 supplies the three-phase AC current to the motor 1 in accordance with the specified three-phase voltage values as described above.

The speed estimator 30 uses a whole or a part of the values $v_\gamma^*$, $v_\delta^*$, $i_\gamma$ and $i_\delta$ so as to calculate the estimated motor speed $\omega_e$. Various methods are known as the method for calculating the estimated motor speed $\omega_e$, and any method can be used for calculating $\omega_e$. For example, the speed estimator 30 calculates the axial error $\Delta\theta$ from the γ-axis component $E_{ex\gamma}$ and the δ-axis component $E_{ex\delta}$ of the extension induction voltage (extended electromotive force) $E_{ex}$ in accordance with the equation (5) as below. Note that when $\Delta\theta$ is calculated, derivative terms $pL_d i_\gamma$ and $pL_d i_\delta$ can be ignored.

$$\Delta\theta = \tan^{-1}\frac{-E_{ex\gamma}}{E_{ex\delta}} \quad (5)$$
$$= \tan^{-1}\frac{-(v_\gamma^* - (R_a + pL_d)i_\gamma + \omega_e L_q i_\delta)}{v_\delta^* - (R_a + pL_d)i_\delta - \omega_e L_q i_\gamma}$$
$$\approx \frac{v_\gamma^* - (R_a + pL_d)i_\gamma + \omega_e L_q i_\delta}{v_\delta^* - (R_a + pL_d)i_\delta - \omega_e L_q i_\gamma}$$

Then, the speed estimator 30 performs the proportional-plus-integral control so that the axial error $\Delta\theta$ converges to zero so as to calculate and deliver the estimated motor speed $\omega_e$. The integrator 31 performs integration on the estimated motor speed $\omega_e$ so as to calculate and deliver the estimated rotor position $\theta_e$. In addition, the speed estimator 30 delivers $E_{ex\gamma}$ and $E_{ex\delta}$ calculated for calculating $\Delta\theta$ to the current estimator 23a.

An operation of the current estimator 23a will be described in detail. In the second example, the above-mentioned second estimating method is used. Individual portions of the motor driving system shown in FIG. 9 update the individual values ($i_\gamma$, $v_\gamma^*$, $\omega_e$ and the like) calculated inside the motor driving system at the sampling period $T_S$ sequentially.

The current estimator 23a calculates the estimated current based on $i_\gamma$ and $i_\delta$ from the current switching portion 24a, $v_\gamma^*$ and $v_\delta^*$ from the voltage calculating portion 25a, $\omega_e$ from the integrator 31 and $E_{ex\gamma}$ and $E_{ex\delta}$ from the speed estimator 30. More specifically, the current estimator 23a calculates $i_{\gamma e}$(k+1) and $i_{\delta e}$(k+1) in accordance with the above-mentioned equations (2-6) and (2-7) in the immeasurable period after setting the previous $i_\gamma$ and $i_\delta$ as $i_\gamma$(k) and $i_\delta$(k), the previous $v_\gamma^*$ and $v_\delta^*$ as $v_\gamma^*$(k) and $v_\delta^*$(k), the previous $\omega_e$ as $\omega_e$(k), and the previous $E_{ex\gamma}$ and $E_{ex\delta}$ as $E_{ex\gamma}$(k) and $E_{ex\delta}$(k), and it delivers the calculated $i_{\gamma e}$(k+1) and $i_{\delta e}$(k+1) as $i_{\gamma e}$ and $i_{\delta e}$ this time.

Just before changing from the measurable period to the immeasurable period, the current switching portion 24a delivers $i_\gamma$ and $i_\delta$ based on the measured current ($i_{\gamma s}$ and $i_{\delta s}$). For this reason, just after changing from the measurable period to the immeasurable period, $i_\gamma$ and $i_\delta$ based on the measured current are used as $i_\gamma$(k) and $i_\delta$(k) so that the estimated current ($i_{\gamma e}$ and $i_{\delta e}$) is calculated. After that, if the immeasurable period continues, $i_\gamma$ and $i_\delta$ based on the estimated current are delivered from the current switching portion 24a. Therefore, $i_\gamma$ and $i_\delta$ based on the estimated current are used as new $i_\gamma$(k) and $i_\delta$(k) for continuing to calculate the estimated current.

Note that the approximation "sin $\Delta\theta\approx0$ and cos $\Delta\theta\approx1$" enables approximation "$E_{ex\gamma}\approx0$ and $E_{ex\delta}\approx\omega_e\Phi_a$". When the estimated current is calculated by using the above-mentioned equations (2-6) and (2-7), the approximation described above may be used.

When it is considered that current supplied to the motor 1 is a current vector on the rotating coordinate, $i_\gamma$ and $i_\delta$ are orthogonal biaxial components ($\gamma$-axis component and $\delta$-axis component) of the current vector, and the orthogonal biaxial components form the current vector. In other words, the current estimator 23a estimates the current vector on the $\gamma\delta$ coordinate.

According to the second example, the same effect as the first example can be obtained.

Third Example

Figure 10:
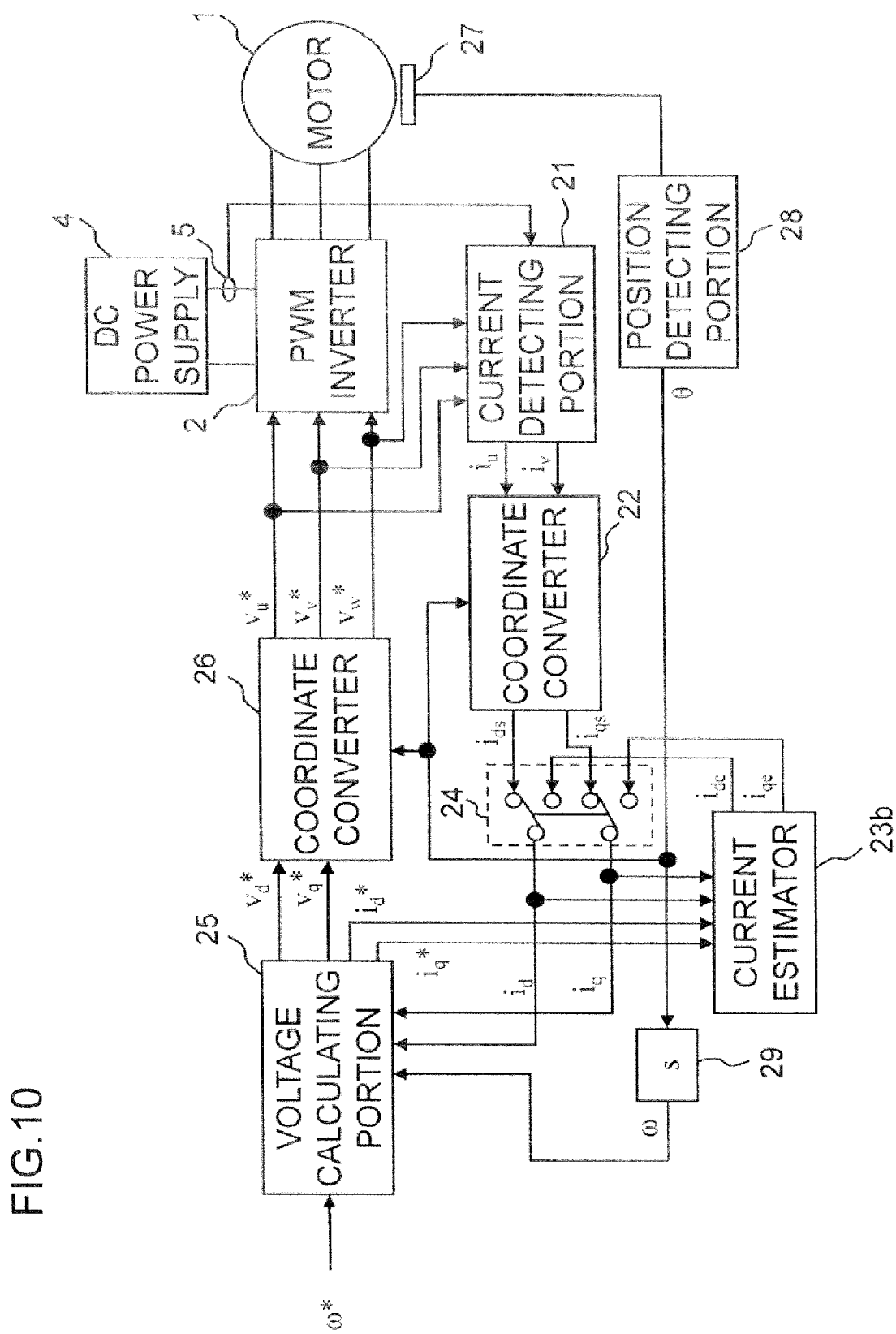
FIG. 10 is a block diagram of a general structure of a motor driving system according to a third example of the present invention.

Next, a third example will be described. In the third example, the above-mentioned third estimating method is utilized. FIG. 10 is a block diagram of a general structure of a motor driving system according to the third example. In FIG. 10, the same parts as FIGS. 1 and 8 are denoted by the same references. Overlapping description of the same part will be omitted.

The motor driving system shown in FIG. 10 is provided with a current estimator 23b. The motor driving system shown in FIG. 10 is different from the motor driving system shown in FIG. 8 in that the current estimator 23 of the motor driving system shown in FIG. 8 is replaced with the current estimator 23b, and other points are the same between the both motor driving systems. However, in the third example, the specified d-axis current value $i_d^*$ and the specified q-axis current value $i_q^*$ calculated by the voltage calculating portion 25 are delivered to the current estimator 23b. In the voltage calculating portion 25, the decoupling control (decoupling current control) is performed in accordance with the above-mentioned equation (3-1) and the equation (3-2). Individual portions of the motor driving system shown in FIG. 10 update the individual values ($i_d$, $v_d^*$, $i_d^*$, $\omega$ and the like) calculated inside the motor driving system at the sampling period $T_S$ sequentially.

The current estimator 23b calculates the estimated d-axis current $i_{de}$ and the estimated q-axis current $i_{qe}$ during the "immeasurable period" in which current values of two phases cannot be measured, in accordance with the above-mentioned third estimating method, and it delivers them to the current switching portion 24.

This will be described more in detail. The current estimator 23b calculates the estimated current based on $i_d$ and $i_q$ from the current switching portion 24 as well as $i_d^*$ and $i_q^*$ from the voltage calculating portion 25. More specifically, the current estimator 23b calculates $i_{de}$(k+1) and $i_{qe}$(k+1) in accordance with the above-mentioned equations (3-8) and (3-9) in the immeasurable period after setting the previous $i_d$ and $i_q$ as $i_d$(k) and $i_q$(k), and $i_d^*$ and $i_q^*$ this time as $i_d^*$(k+1) and $i_q^*$(k+1), and it delivers the calculated $i_{de}$(k+1) and $i_{qe}$(k+1) as $i_{de}$ and $i_{qe}$ this time. In order to enable this, in each sampling period $T_S$, the voltage calculating portion 25 delivers $i_d^*$ and $i_q^*$ prior to calculation of $i_{de}$ and $i_{qe}$.

Just before changing from the measurable period to the immeasurable period, the current switching portion 24 delivers $i_d$ and $i_q$ based on the measured current ($i_{ds}$ and $i_{qs}$). For this reason, just after changing from the measurable period to the immeasurable period, id and iq based on the measured current are used as $i_d$(k) and $i_q$(k) so that the estimated current ($i_{de}$ and $i_{qe}$) is calculated. After that, if the immeasurable period continues, $i_d$ and $i_q$ based on the estimated current are delivered from the current switching portion 24. Therefore, $i_d$ and $i_q$ based on the estimated current are used as new $i_d$(k) and $i_q$(k) for continuing to calculate the estimated current.

According to the third example, in the immeasurable period, orthogonal biaxial components ($i_d$ and $i_q$) that form the current vector on the dq coordinate can be estimated based on the past current values ($i_d$ and $i_q$) and specified current values ($i_d^*$ and $i_q^*$).

When the above-mentioned third estimating method is used for applying the decoupling control to the current control, the current response can be approximated to a first order lag as described above. Therefore, it is possible to estimate which direction the current flows by referring to the past current value and the latest specified current value. The calculation of the estimated current by using the above-mentioned equations (3-8) and (3-9) means to estimate the current considering response characteristics of this first order lag.

In this way, when estimation of current is performed considering response characteristics of current alteration, current can be estimated accurately also in the transient state so that the motor 1 can be controlled by an appropriate vector control. In addition, since correction of the pulse width of the PWM signal such that distortion occurs in the voltage is not performed, the motor 1 can be driven smoothly. For this reason, vibration and noise when the motor 1 is driven can be controlled to low levels.

Fourth Example

Figure 11:
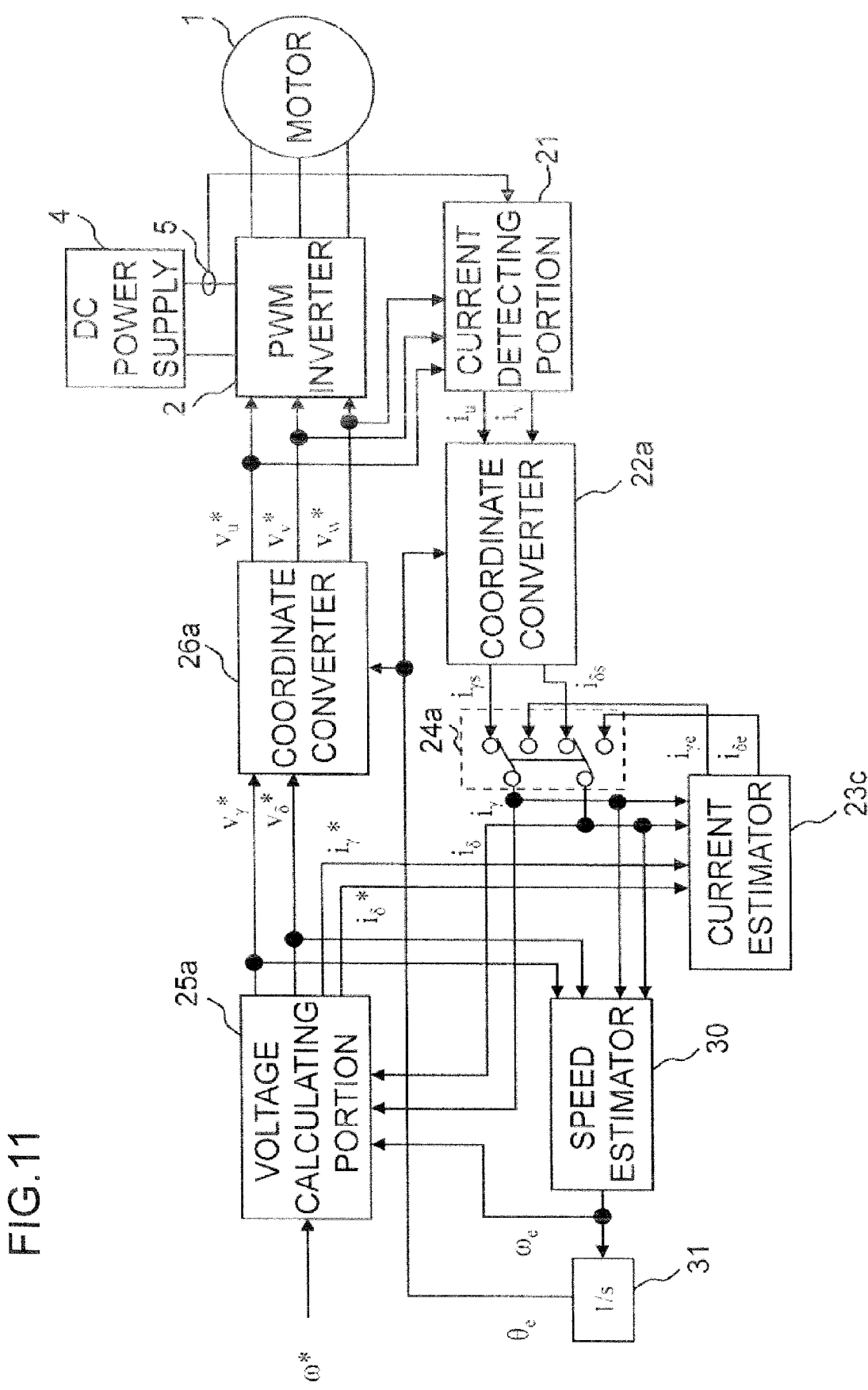
FIG. 11 is a block diagram of a general structure of a motor driving system according to a fourth example of the present invention.

Next, a fourth example will be described. In the fourth example, the above-mentioned fourth estimating method is utilized. FIG. 11 is a block diagram of a general structure of a motor driving system according to the fourth example. In FIG. 11, the same parts as FIGS. 1 and 9 are denoted by the same references, Overlapping description of the same part will be omitted.

The motor driving system shown in FIG. 11 is provided with a current estimator 23c. The motor driving system shown in FIG. 11 is different from the motor driving system shown in FIG. 9 in that the current estimator 23a of the motor driving system shown in FIG. 9 is replaced with the current estimator 23c, and other points are the same between the both motor driving systems. However, in the fourth example, the specified γ-axis current value $i_\gamma^*$ and the specified δ-axis current value $i_\delta^*$ calculated by the voltage calculating portion 25a are delivered to the current estimator 23c. In the voltage calculating portion 25a, the decoupling control (decoupling current control) is performed in accordance with the above-mentioned equation (4-1) and the equation (4-2). Individual portions of the motor driving system shown in FIG. 11 update the individual values ($i_\gamma$, $v_\gamma^*$, $i_\gamma^*$, $\omega_e$ and the like) calculated inside the motor driving system at the sampling period $T_S$ sequentially.

The current estimator 23c calculates the estimated γ-axis current $i_{\gamma e}$ and the estimated δ-axis current $i_{\delta e}$ during the "immeasurable period" in which current values of two phases cannot be measured, in accordance with the above-mentioned fourth estimating method, and it delivers them to the current switching portion 24a.

This will be described more in detail. The current estimator 23c calculates the estimated current based on $i_\gamma$ and $i_\delta$ from the current switching portion 24a as well as $i_\gamma^*$ and $i_\delta^*$ from the voltage calculating portion 25a. More specifically, the current estimator 23c calculates the $i_{\gamma e}(k+1)$ and $i_{\delta e}(k+1)$ in accordance with the above-mentioned equations (4-8) and (4-9) in the immeasurable period after setting the previous $i_\gamma$ and $i_\delta$ as $i_\gamma(k)$ and $i_\delta(k)$ and $i_\gamma^*$ and $i_\delta^*$ this time as $i_\gamma^*(k+1)$ and $i_\delta^*(k+1)$, and it delivers the calculated $i_{\gamma e}(k+1)$ and $i_{\delta e}(k+1)$ as $i_{\gamma e}$ and $i_{\delta e}$ this time. In order to enable this, in each sampling period $T_S$, the voltage calculating portion 25a delivers $i_\gamma^*$ and $i_\delta^*$ prior to calculation of $i_{\gamma e}$ and $i_{\delta e}$.

Just before changing from the measurable period to the immeasurable period, the current switching portion 24 delivers $i_\gamma$ and $i_\delta$ based on the measured current ($i_{\gamma s}$ and $i_{\delta s}$). For this reason, just after changing from the measurable period to the immeasurable period, $i_\gamma$ and $i_\delta$ based on the measured current are used as $i_\gamma(k)$ and $i_\delta(k)$ so that the estimated current ($i_{\gamma e}$ and $i_{\delta e}$) is calculated. After that, if the immeasurable period continues, $i_\gamma$ and $i_\delta$ based on the estimated current are delivered from the current switching portion 24a. Therefore, $i_\gamma$ and $i_\delta$ based on the estimated current are used as new $i_\gamma(k)$ and $i_\delta(k)$ for continuing to calculate the estimated current.

According to the fourth example, in the immeasurable period, orthogonal biaxial components ($i_d$ and $i_q$) that form the current vector on the γδ coordinate can be estimated based on the past current value ($i_\gamma$ and $i_\delta$) and specified current value ($i_\gamma^*$ and $i_\delta^*$). Thus, the same effect as the third example can be obtained.

Fifth Example

Although the discrimination whether it is the measurable period the or immeasurable period is performed based on the specified three-phase voltage value (pulse width of the PWM signal of each phase) in the first to the fourth examples, it is possible to perform the discrimination based on a vector of voltage applied to the motor 1 (hereinafter referred to as a voltage vector, simply). As an example for explaining this discrimination method, a fifth example will be described. The discrimination method described in the fifth example is used in a combination with any one of the first to the fourth examples.

Figure 12:
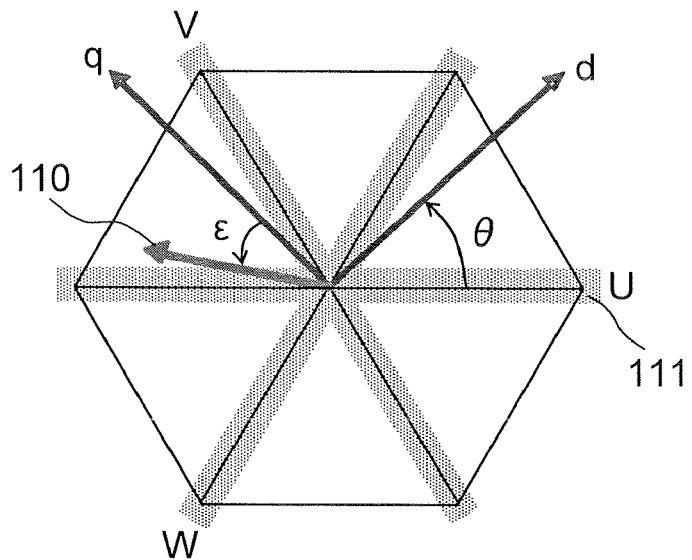
FIG. 12 is a space vector diagram showing a relationship among U-phase axis, V-phase axis and W-phase axis that are fixed axes and d-axis and q-axis that are rotation axes and a voltage vector in a fifth example of the present invention.

FIG. 12 shows a space vector diagram indicating a relationship among the U-phase axis, the V-phase axis and the W-phase axis that are fixed axes, the d-axis and the q-axis that are rotation axes, and a voltage vector. The vector denoted by reference 110 is the voltage vector. A phase of the voltage vector 110 viewed from the q-axis is shown by ε. A phase of the voltage vector 110 with respect to the U-phase axis is expressed by (θ+ε+π/2). The voltage vector 110 indicates voltage that is applied to the motor 1, which is regarded as a vector. For example, when the dq coordinate is noted, the d-axis component and the q-axis component of the voltage vector 110 are $v_d(\approx v_d^*)$ and $v_q(\approx v_q^*)$, respectively.

An asterisk region 111 with hatching that includes a vicinity of the U-phase axis, a vicinity of the V-phase axis and a vicinity of the W-phase axis indicates the region where current values of two phases cannot be detected. For example, if the V-phase voltage and the W-phase voltage are close to each other so that current values of two phases cannot be detected, the voltage vector 110 is located at a vicinity of the U-phase axis. If the U-phase voltage and the W-phase voltage are close to each other so that current values of two phases cannot be detected, the voltage vector 110 is located at a vicinity of the V-phase axis.

In this way, the region 111 where current values of two phases cannot be detected exist every 60 degrees of electrical angle with reference to the U-phase axis, and a period while the voltage vector 110 exists in the region 111 is the above-mentioned immeasurable period.

Figure 13:
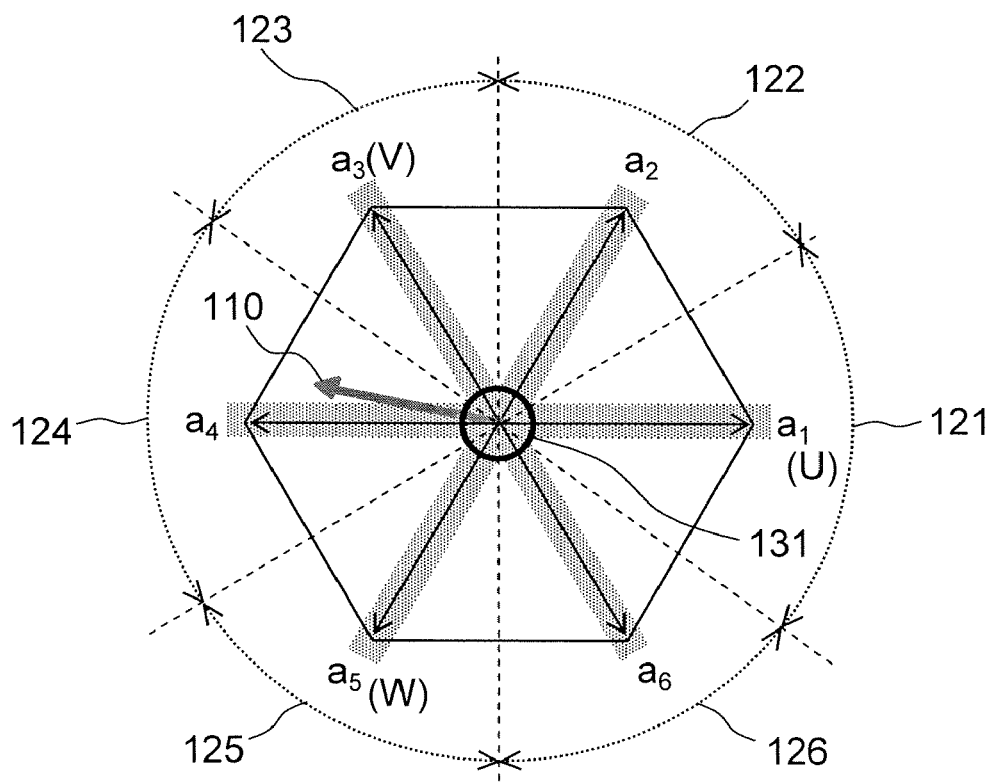
FIG. 13 is a diagram for explaining a-axis defined in the fifth example of the present invention.

Now, characteristics of the region 111 where current values of two phases cannot be detected are noted so as to consider a coordinate that rotates in a stepping manner every 60 degrees of electrical angle. The coordinate is referred to as an ab coordinate (note that the dq coordinate and the γδ coordinate are coordinates that rotate in a continuous manner). The ab coordinate has coordinate axes that are the a-axis and the b-axis that are orthogonal to each other. FIG. 13 shows six axes that the a-axis can be. The a-axis becomes one of $a_1$-$a_6$ axes in accordance with a phase (θ+ε+π/2) of the voltage vector 110. The $a_1$ axis, $a_3$ axis and $a_5$ axis match the U-phase axis, the V-phase axis and the W-phase axis, respectively. The $a_2$ axis, the $a_4$ axis and the $a_6$ axis are respectively an intermediate axis between the $a_1$ axis and the $a_3$ axis, an intermediate axis between the $a_3$ axis and the $a_5$ axis, and an intermediate axis between the $a_5$ axis and the $a_1$ axis. Note that a circle denoted by reference 131 will be described later.

If the voltage vector 110 is located in the range denoted by reference 121, i.e., "11π/6≦(θ+ε+π/2)<0" or "0≦(θ+ε+π/2)<π/6" holds, the a-axis becomes the $a_1$ axis.

If the voltage vector 110 is located in the range denoted by reference 122, i.e., "π/6≦(θ+ε+π/2)<π/2" holds, the a-axis becomes the $a_2$ axis.

If the voltage vector 110 is located in the range denoted by reference 123, i.e., "π/2≦(θ+ε+π/2)<5π/6" holds, the a-axis becomes the $a_3$ axis.

If the voltage vector 110 is located in the range denoted by reference 124, i.e., "5π/6≦(θ+ε+π/2)<7π/6" holds, the a-axis becomes the $a_4$ axis.

If the voltage vector 110 is located in the range denoted by reference 125, i.e., "7π/6≦(θ+ε+π/2)<3π/2" holds, the a-axis becomes the $a_5$ axis.

If the voltage vector 110 is located in the range denoted by reference 126, i.e., "3π/2≦(θ+ε+π/2)<11π/6" holds, the a-axis becomes the $a_6$ axis.

For example, if the voltage vector 110 is located at the position shown in FIG. 13, the a-axis becomes the $a_4$ axis.

In this way, the a-axis rotates in a stepping manner every 60 degrees along with rotation of the voltage vector, and the b-axis also rotates in a stepping manner every 60 degrees together with the a-axis and being orthogonal to the same. The a-axis and the b-axis can be expressed to be coordinate axes that are digitized every 60 degrees and rotate every 60 degrees. For this reason, the a-axis is always located at the center of the region where current values of two phases cannot be detected. In the fifth example, the voltage vector on the dq coordinate is converted into a voltage vector on the ab coordinate, and the a-axis component and the b-axis component of the converted voltage vector on the ab coordinate are referred to, so that the discrimination whether it is the measurable period or the immeasurable period is performed. As described later, if the b-axis component is small, it is decided to be the immeasurable period, for example.

Figure 14:
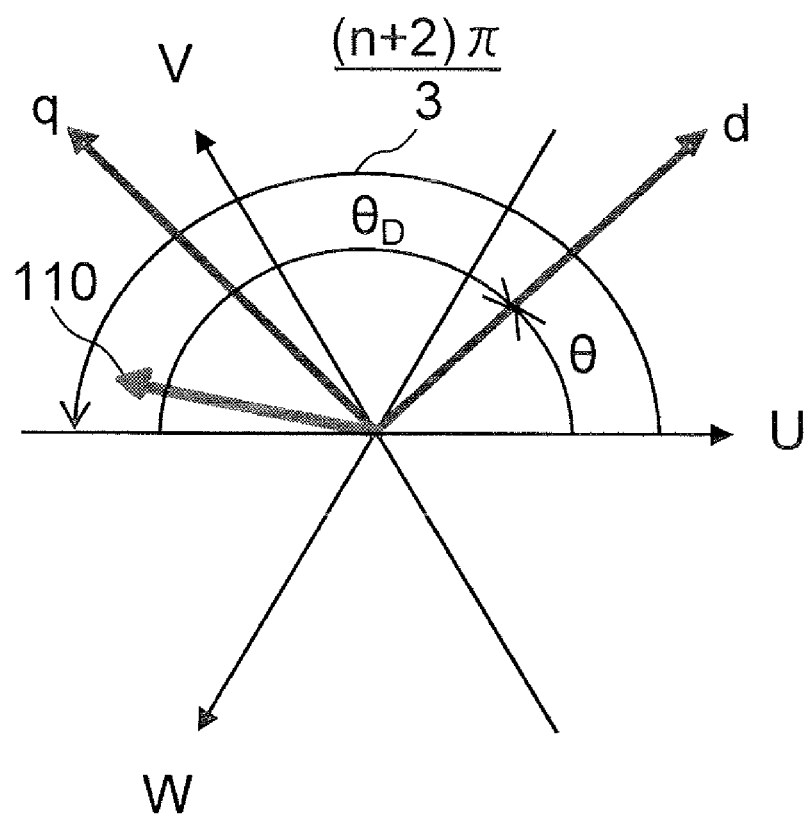
FIG. 14 is a diagram showing a disassembling manner of a rotor phase (θ) in the fifth example of the present invention.

A concrete procedure of the discrimination method will be described. A phase of the axis that is closest to the voltage vector 110 among the $a_1$ to the $a_6$ axes is expressed by "(n+2)π/3" with reference to the U-phase axis. Here, n is a quotient obtained by dividing (θ+ε) by π/3. For convenience sake, as shown in FIG. 14, θ is divided into the above-mentioned phase (n+2)π/3 and a phase difference $θ_D$ between it and phase (n+2)π/3. A relationship between these phases is expressed by the equation (6-1) and the equation (6-2).

$$\theta + \varepsilon = \frac{n\pi}{3} + \alpha, \left(\text{where, } 0 \leq \alpha < \frac{\pi}{3}\right) \quad (6\text{-}1)$$

$$\theta = \theta_D + \frac{(n+2)\pi}{3} \quad (6\text{-}2)$$

Coordinate conversion of the dq coordinate is performed by the phase difference $θ_D$, so that the voltage vector 110 is regarded as a voltage vector on the ab coordinate. Considering on the ab coordinate, the a-axis component and the b-axis component of the voltage vector 110 is regarded as the a-axis voltage $v_a$ and the b-axis voltage $v_b$. Then, the d-axis voltage $v_d$ and q-axis voltage $v_q$ as well as the a-axis voltage $v_a$ and the b-axis voltage $v_b$ hold a coordinate conversion equation of the equation (6-3) as below.

$$\begin{pmatrix} v_a \\ v_b \end{pmatrix} = \begin{bmatrix} \cos\theta_D & -\sin\theta_D \\ \sin\theta_D & \cos\theta_D \end{bmatrix} \begin{pmatrix} v_d \\ v_q \end{pmatrix} \quad (6\text{-}3)$$

The phase difference $θ_D$ can be calculated as below. A value of n matching ε calculated by using the equation (6-4) as below (i.e., a quotient obtained by dividing (θ+ε) by π/3) is determined by referring to θ. Substituting the determined n and θ into the above-mentioned equation (6-2), then the phase difference $θ_D$ can be obtained. Note that $v_d^*$ and $v_q^*$ are used as $v_d$ and $v_q$ in the equation (6-4) as below.

$$\varepsilon = \tan^{-1}\left(\frac{-v_d}{v_q}\right) \quad (6\text{-}4)$$

Then, the discrimination between the measurable period and the immeasurable period is performed based on the a-axis voltage $v_a$ and the b-axis voltage $v_b$ that are calculated in accordance with the equation (6-3).

For example, if this discrimination method is used in the first or the third example (FIG. 8 or 10), the calculated $v_d^*$ and $v_q^*$ are used as $v_d$ and $v_q$ in the equation (6-3), so that the a-axis voltage $v_a$ and the b-axis voltage $v_b$ are calculates in accordance with the equation (6-3). Then, it is decided whether or not the calculated a-axis voltage $v_a$ and the b-axis voltage $v_b$ satisfy the equations (6-5) and (6-6) as below.

$$|v_b| < \Delta \quad (6\text{-}5)$$

$$v_a < \sqrt{3}\Delta \quad (6\text{-}6)$$

Then, if any one of the equations (6-5) and (6-6) is satisfied, it is decided that the present time belongs to the immeasurable period. If each of the equations (6-5) and (6-6) isn't satisfied, it is decided that the present time belongs to the measurable period. In other words, if an absolute value of the calculated b-axis voltage $v_b$ is smaller than a predetermined threshold value Δ, it is decided to be the immeasurable period because the voltage vector 110 is located at a vicinity of the a-axis . In addition, it is decided whether the voltage vector 110 is included inside a circle 131 shown in FIG. 13 by using the equation (6-6). The state where the voltage vector 110 is included inside the circle 131 corresponds to the state where the phase voltages of three phases are close to each other. In this state, current values of two phases cannot be detected regardless of a level of the b-axis voltage $v_b$.

Although the fifth example is described above based on noting the case where the position sensor for detecting rotor position is provided, i.e., noting the d-axis and the q-axis that are actual axes, the method for discriminating between the measurable period and the immeasurable period described in the fifth example can be applied to the second or the fourth example in which the position sensor is not provided. When it is applied to the second or the fourth example, "d" and "q" in the description of the fifth example should be replaced with "γ" and "δ", respectively. Naturally, θ and ω should also be replaced with $θ_e$ and $ω_e$.

Thus, in the fifth example, the discrimination between the measurable period and the immeasurable period is performed based on the voltage vector that is applied to the motor 1. A result of this discrimination is used for a process of switching by the current switching portion 24 or 24a shown in FIGS. 8-11.

Sixth Example

Although in the first to the fourth example the motor 1 is controlled by vector control so that the d-axis and the q-axis can be detected or estimated, it is possible to detect or estimate other axes different from the d-axis and the q-axis. As an example thereof, a sixth example will be described in which a dm-axis and a qm-axis are estimated as the applicant proposes. The sixth example can be applied to the second or the fourth example.

Detailed explanation about the dm-axis and the qm-axis is described in the specification and the like of Japanese patent application No. 2006-177646, and it is also described in "Position Sensorless Vector control for Permanent Magnet Synchronous Motors Based on Maximum Torque Control Frame" by HIDA and two others, Institute of Electrical Engineers, Industrial Application Department Conference Lecture Papers, August 2006, pp. 385-388 (I-385~I-388). Hereinafter, the method about the dm-axis and the qm-axis is referred to as a dmqm method.

Figure 15:
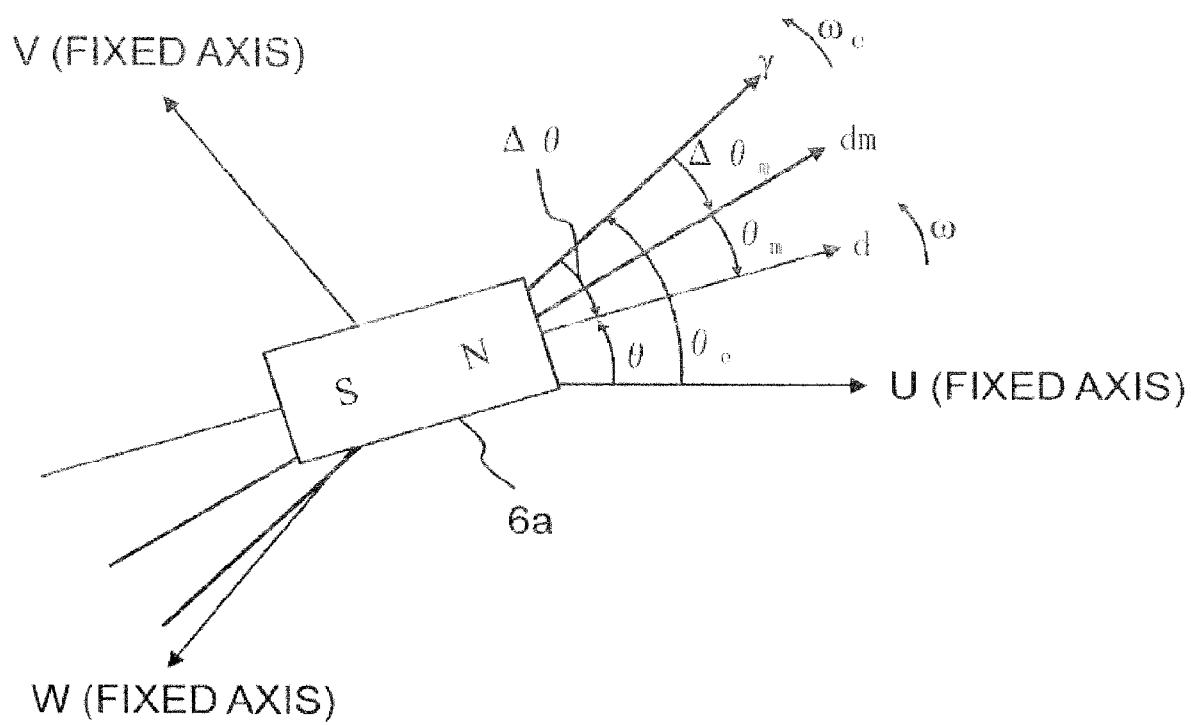
FIG. 15 is an analytic model diagram for explaining a dmqm method according to a sixth example of the present invention.
Figure 16:
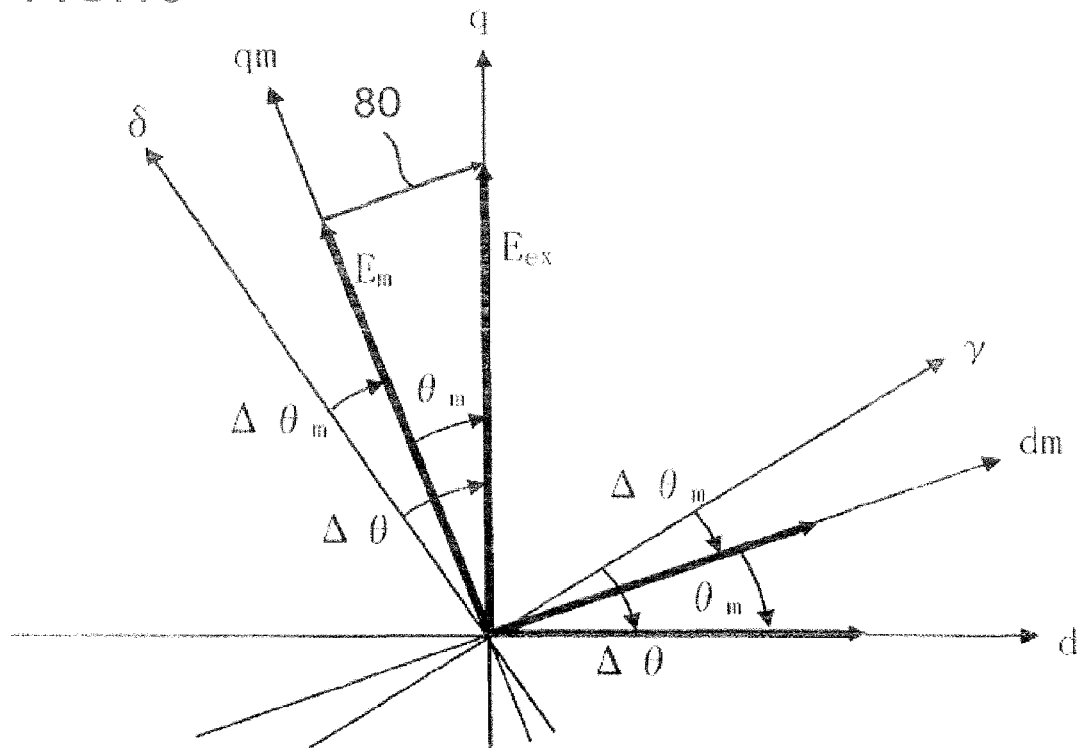
FIG. 16 is an analytic model diagram for explaining a dmqm method according to the sixth example of the present invention.

FIGS. 15 and 16 show analytic model diagrams of the motor 1 for explaining the dmqm method. FIG. 15 corresponds to a diagram showing the analytic model diagram shown in FIG. 7 in a further detailed manner.

When the maximum torque control is realized, a rotation axis having the same direction as the current vector to be supplied to the motor 1 is defined to be the qm-axis. Then, the axis lagging from the qm-axis by 90 degrees of electrical angle is defined as the dm-axis. A coordinate using the dm-axis and the qm-axis as coordinate axes is referred to as a dmqm coordinate.

As known well, the motor current that realizes the maximum torque control includes a positive q-axis component and a negative d-axis component. For this reason, the qm-axis leads the q-axis in phase. In FIGS. 15 and 16, a counterclockwise direction is the leading direction in phase.

A phase (angle) of the q-axis viewed from the qm-axis is represented by $\theta_m$, and a phase (angle) of the qm-axis viewed from the δ-axis is represented by $\Delta\theta_m$. In this case, of course, a phase of the d-axis viewed from the dm-axis is also $\theta_m$, and a phase of the dm-axis viewed from the γ-axis is also $\Delta\theta_m$. $\theta_m$ is a lead angle of the qm-axis (dm-axis) viewed from the q-axis (d-axis). $\Delta\theta_m$ indicates an axial error between the qm-axis and the δ-axis. $\Delta\theta$ that is an axial error between the d-axis and the γ-axis is expressed by "$\Delta\theta = \Delta\theta_m + \theta_m$".

As described above, the dm-axis leads the d-axis in phase, and in this case $\theta_m$ has a negative value. In the same manner, if the γ-axis leads the dm-axis in phase, $\Delta\theta_m$ has a negative value. The vector ($E_m$ and the like) shown in FIG. 16 will be described later.

In addition, the dm-axis component and the qm-axis component of the motor current $I_a$ are respectively expressed by the dm-axis current $i_{dm}$ and the qm-axis current $i_{qm}$. The dm-axis component and the qm-axis component of the motor voltage $V_a$ are respectively expressed by the dm-axis voltage $v_{dm}$ and the qm-axis voltage $v_{qm}$.

In the dmqm method, an axial error $\Delta\theta_m$ between the qm-axis (dm-axis) and the δ-axis (γ-axis) is estimated and the γ-axis that is the estimated axis is converged to the dm-axis (i.e., the axial error $\Delta\theta_m$ is converged to zero). Then, the motor current $I_a$ is divided into the qm-axis current $i_{qm}$ that is parallel with the qm-axis and the dm-axis current $i_{dm}$ that is parallel with the dm-axis, so that the motor 1 is controlled by the vector control.

Figure 17:
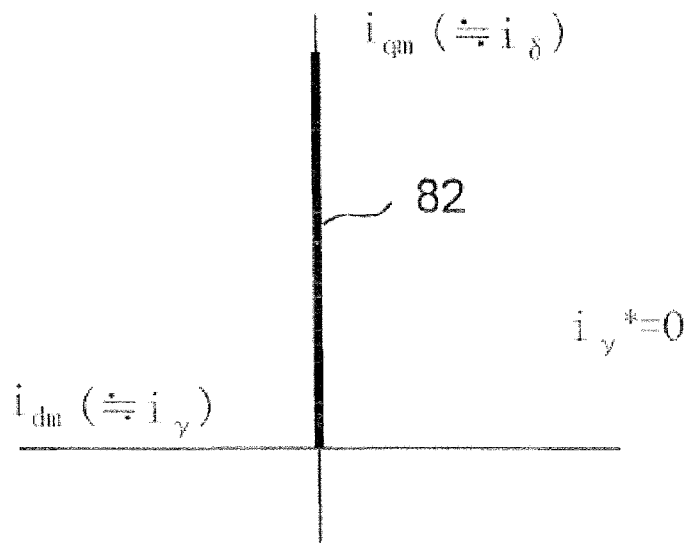
FIG. 17 is a diagram showing a current locus of motor current in the case where the sixth example of the present invention is adopted.
Figure 18:
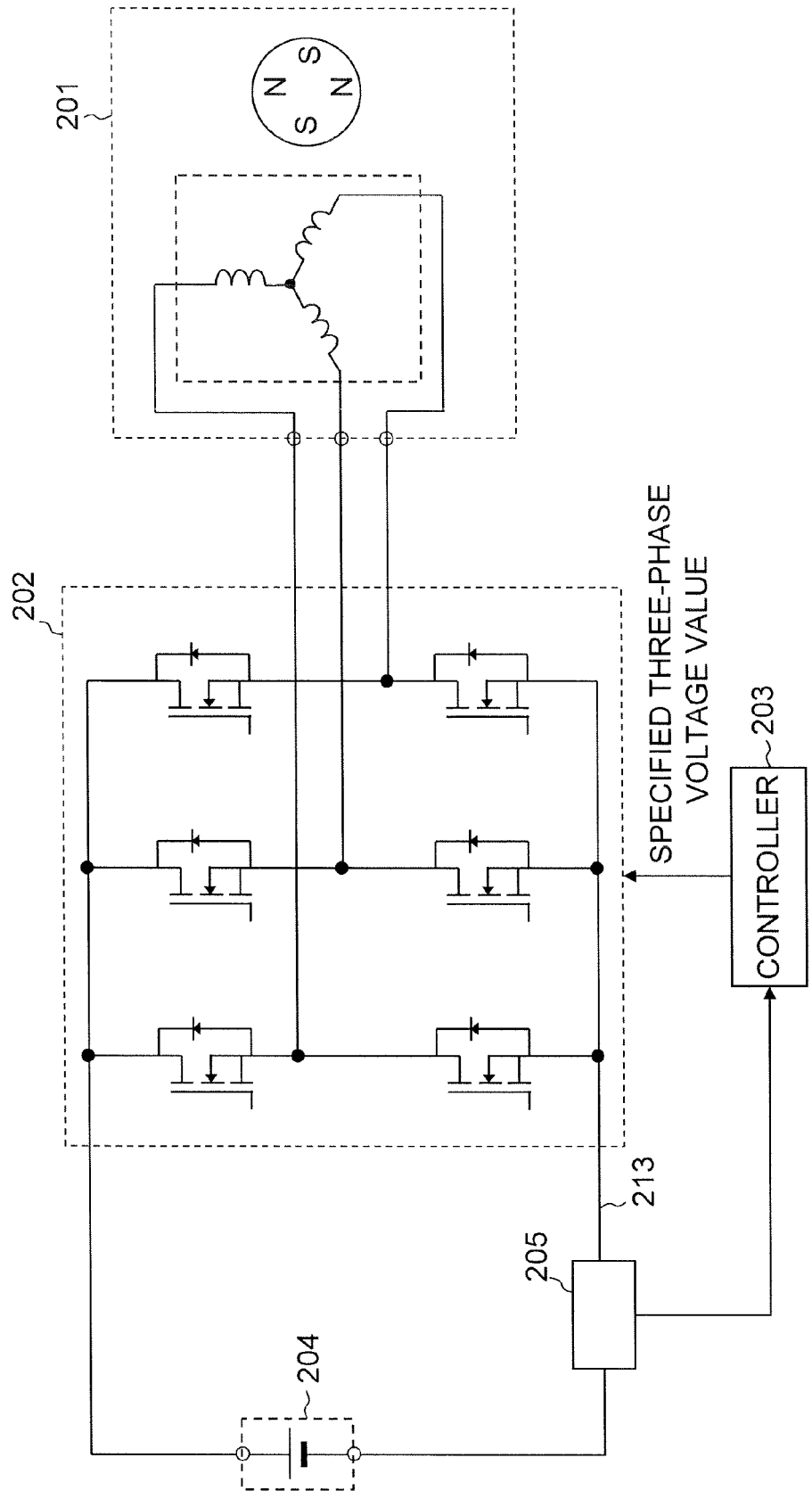
FIG. 18 is a block diagram of a general structure of a conventional motor driving system in which a single shunt current detecting method is adopted.
Figure 19:
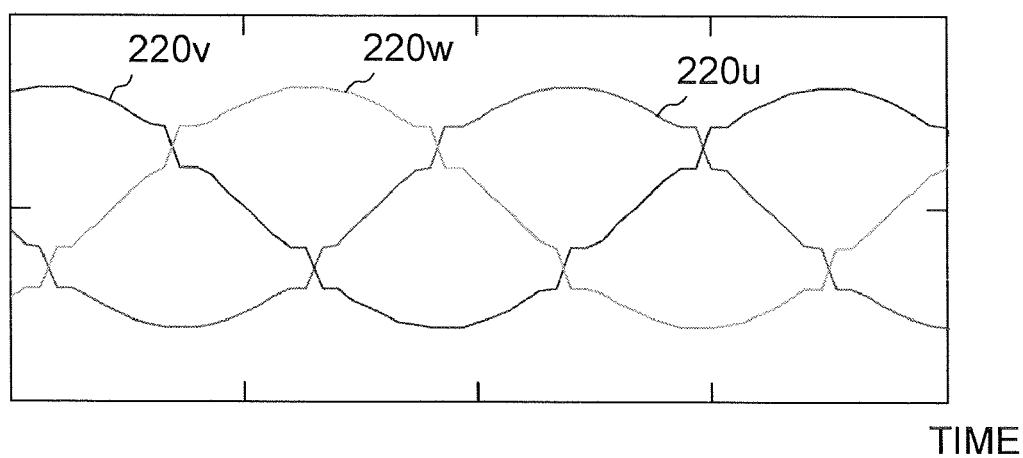
FIG. 19 is a diagram showing a correction example of a specified voltage value (pulse width) in the case where the single shunt current detecting method is adopted as a conventional technique.

As understood clearly from the definition of the qm-axis, a current locus of the motor current $I_a$ when the maximum torque control is performed is on the qm-axis as shown in FIG. 17 by the solid line 82. For this reason, when the maximum torque control is performed, a complicated calculation of the specified γ-axis current value $i_\gamma^*$ is unnecessary so that a calculation load can be reduced. In this case, the specified γ-axis current value $i_\gamma^*$ is set to zero or a predetermined value in a vicinity of zero regardless of a value of $i_\delta$.

The dmqm method will be described by using the voltage equation. Note that for consistency of numbers of equations with the specification of Japanese patent application No. 2006-177646, equations (7)-(29) are not provided in this specification.

Noting the dm axis and the qm axis, the above-mentioned equation (2-3) that is the extension induction voltage (extended electromotive force) equation on the estimated axis is rewritten, and then the equation (30) is obtained.

$$\begin{bmatrix} v_{dm} \\ v_{qm} \end{bmatrix} = \begin{bmatrix} R_a + pL_d & -\omega L_q \\ \omega L_q & R_a + pL_d \end{bmatrix} \begin{bmatrix} i_{dm} \\ i_{qm} \end{bmatrix} + E_{ex} \begin{bmatrix} -\sin\theta_m \\ \cos\theta_m \end{bmatrix} \quad (30)$$

Here, it is defined that the equation (31) holds. Further, considering that $i_d = i_{qm} \cdot \sin\theta_m$, the equation (32) holds.

$$L_{q1} i_{qm} = \sin\theta_m \{\Phi_a + (L_d - L_q) i_d\} \quad (31)$$

$$L_{q1} i_{qm} = \sin\theta_m \{\Phi_a + (L_d - L_q) i_d\} = \sin\theta_m \{\Phi_a + (L_d - L_q) i_{qm} \sin\theta_m\} \quad (32)$$

When the equation (30) is deformed by using the equation (32), the equation (33) is obtained. Here, $E_m$ is expressed by the equation (34). $L_{q1}$ is a virtual inductance that depends on $\theta_m$. $L_{q1}$ is defined for a convenience sake so that $E_{ex} \cdot \sin\theta_m$ in the second term of the right side of the equation (30) is regarded as a voltage drop caused by the virtual inductance. Note that $L_{q1}$ has a negative value.

$$\begin{bmatrix} v_{dm} \\ v_{qm} \end{bmatrix} = \begin{bmatrix} R_a + pL_d & -\omega(L_q + L_{q1}) \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (33)$$

$$E_m = (\omega((L_d - L_q) i_d + \Phi_a) - (L_d - L_q)(p i_q))\cos\theta_m = E_{ex}\cos\theta_m \quad (34)$$

Here, it is approximated that the equation "$L_m = L_q + L_{q1}$" holds (Since $\theta_m$ depends on $i_q$ and $i_{qm}$, $L_{q1}$ depends on $i_q$ and $i_{qm}$. In addition, $L_q$ also depends on $i_q$ and $i_{qm}$ due to an influence of magnetic saturation. The dependency of $L_{q1}$ on $i_q$ and the dependency of $L_q$ on $i_q$ are summarized in $L_m$ so as to consider the influence of $i_q$ and $i_{qm}$ when the estimation is performed). Then, the equation (33) is deformed into the equation (35) as below.

$$\begin{bmatrix} v_{dm} \\ v_{qm} \end{bmatrix} = \begin{bmatrix} R_a + pL_d & -\omega L_m \\ \omega L_q & R_a + pL_d \end{bmatrix} \begin{bmatrix} i_{dm} \\ i_{qm} \end{bmatrix} + E_m \begin{bmatrix} 0 \\ 1 \end{bmatrix} \quad (35)$$

Further, the equation (35) is deformed so that the equation (36) is obtained as below. Here, $E_{exm}$ is expressed by the equation (37) as below.

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m \end{bmatrix} + \omega(L_q - L_m) \begin{bmatrix} 0 & 0 \\ 1 & 0 \end{bmatrix} \begin{bmatrix} i_{dm} \\ i_{qm} \end{bmatrix} \quad (36)$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_m + \omega(L_q - L_m) i_{dm} \end{bmatrix}$$

$$= \begin{bmatrix} R_a + pL_d & -\omega L_m \\ \omega L_m & R_a + pL_d \end{bmatrix} \begin{bmatrix} i_{dm} \\ i_{qm} \end{bmatrix} + \begin{bmatrix} 0 \\ E_{exm} \end{bmatrix}$$

$$E_{exm} = (\omega((L_d - L_q) i_d + \Phi_a) - (L_d - L_q)(p i_q))\cos\theta_m + \omega(L_q - L_m) i_{dm} \quad (37)$$

$$= E_m + \omega(L_q - L_m) i_{dm}$$

It is supposed that there is the axial error $\Delta\theta_m$ between the γ-axis and the dm-axis. Then, the equation (36) is deformed into the equation (38) as below.

$$\begin{bmatrix} v_\gamma \\ v_\delta \end{bmatrix} = \begin{bmatrix} R_a + pL_d & -\omega L_m \\ \omega L_m & R_a + pL_d \end{bmatrix} \begin{bmatrix} i_\delta \\ i_\gamma \end{bmatrix} + E_{exm} \begin{bmatrix} -\sin\Delta\theta_m \\ \cos\Delta\theta_m \end{bmatrix} - (p\Delta\theta_m) L_d \begin{bmatrix} -i_\delta \\ i_\gamma \end{bmatrix} \quad (38)$$

In addition, when it is approximated that "p Δθ$_m$≈0", "i$_{dm}$≈0" and "(L$_d$−L$_q$)(pi$_q$)≈0" hold, E$_{exm}$ expressed by the equation (37) can be approximated by the equation (39) as below.

$$E_{exm} = (\omega((L_d - L_q)i_d + \Phi_a) - (L_d - L_q)(pi_q))\cos\theta_m + \omega(L_q - L_m)i_{dm} \quad (39)$$
$$\approx (\omega((L_d - L_q)i_\delta\sin\theta_m + \Phi_a) - (L_d - L_q)(pi_q))\cos\theta_m + \omega(L_q - L_m)i_{dm}$$
$$\approx \omega((L_d - L_q)i_\delta\sin\theta_m + \Phi_a)\cos\theta_m$$

In addition, "L$_m$=L$_q$+L$_{q1}$" is substituted into the equation (32), and the obtained equation is solved with respect to θ$_m$, and further it is supposed that "i$_\delta$≈i$_{qm}$" holds. Then, the equation (40) is obtained as below. Since θ$_m$ is a function of i$_\delta$ as expressed by the equation (40), E$_{exm}$ is also a function of i$_\delta$.

$$\theta_m = \sin^{-1}\left(\frac{\Phi_a - \sqrt{\Phi_a^2 + 4(L_q - L_m)(L_q - L_d)i_\delta^2}}{2i_\delta(L_q - L_d)}\right) \quad (40)$$

With reference to FIG. 16, the relationship among E$_{ex}$, E$_m$ and E$_{exm}$ will be further described. E$_{ex}$, E$_m$ and E$_{exm}$ are considered as voltage vectors in a rotating coordinate system. In this case, E$_{ex}$ can be referred to as an extension induction voltage (extended electromotive force) vector. The extension induction voltage vector E$_{ex}$ is an induction voltage (in other words, electromotive force) vector on the q-axis. The extension induction voltage vector E$_{ex}$ is divided into the induction voltage vector on the qm-axis and the induction voltage vector on the dm-axis for consideration. As understood from the equation (34) described above, the induction voltage vector on the qm-axis obtained from this division is E$_m$. In addition, the induction voltage vector (E$_{ex}$·sin θ$_m$) on the dm-axis, which is represented by numeral 80 in FIG. 16, is a voltage drop vector due to the virtual inductance L$_{q1}$.

As understood also from comparison between the equations (34) and (37), E$_{exm}$ is a result obtained by adding ω(L$_q$−L$_m$)i$_{dm}$ to E$_m$. For this reason, in the rotating coordinate system, E$_{exm}$ is also an induction voltage vector on the qm-axis in the same manner as E$_m$. When the maximum torque control is performed, E$_{exm}$ is (substantially) equal to E$_m$ because "i$_{dm}$≈0" holds as described above.

When the dmqm method described above is used in the second or the fourth example, the speed estimator 30 shown in FIG. 9 or 11 calculates the axial error Δθ$_m$ in accordance with the equation (41) as below, for example. E$_{exmγ}$ and E$_{exmδ}$ are respectively the γ-axis component and the δ-axis component of the induction voltage vector E$_{exm}$. The equation (41) as below is obtained by using a result of deformation of the first and the second row in the equation (determinant) (38) described above (here, the third term in the right side of the determinant (38) is ignored). As ω, v$_γ$ and v$_δ$ in the equation (41), ω$_e$, v$_γ$* and v$_δ$* are used. Then, in this case, the speed estimator 30 performs the proportional-plus-integral control so that the axial error Δθ$_m$ is converged to zero, for calculating and delivering the estimated motor speed ω$_e$.

$$\Delta\theta_m = \tan^{-1}\frac{-E_{exm\gamma}}{E_{exm\delta}} \quad (41)$$
$$= \tan^{-1}\frac{-(v_\gamma - (R_a + pL_d)i_\gamma + \omega L_m i_\delta)}{v_\delta - (R_a + pL_d)i_\delta - \omega L_m i_\gamma}$$
$$\approx -\frac{v_\gamma - (R_a + pL_d)i_\gamma + \omega L_m i_\delta}{v_\delta - (R_a + pL_d)i_\delta + \omega L_m i_\gamma}$$

When the Δθ$_m$ is calculated by using the equation (41), the derivative terms pL$_d$i$_γ$ and pL$_d$i$_δ$ can be ignored. In addition, calculation of a value of L$_m$ that is necessary for calculating Δθ$_m$ is performed by using the equation (42) as below. The equation (42) can be obtained by substituting the "i$_{dm}$=0" and the equations (43) and (44) as below into the equation (32) described above, and by solving the equation obtained as a result of the above substitution with respect to L$_{q1}$ and utilizing it.

$$L_m = L_q + L_{q1} \quad (42)$$
$$= L_q + \frac{i_d\{\Phi_a + (L_d - L_q)i_d\}}{i_d^2 + i_q^2}$$

$$i_{qm} = \sqrt{i_d^2 + i_q^2} \quad (43)$$

$$\sin\theta_m = \frac{i_d}{\sqrt{i_d^2 + i_q^2}} \quad (44)$$

Further, the equation (42) described above is deformed by utilizing the equation (45) of the d-axis current i$_d$ matching the maximum torque control and the equation (43) that is a relationship equation (approximate expression) among i$_d$, i$_q$ and i$_{qm}$. Then, L$_m$ becomes a function of i$_{qm}$ (i.e., terms of i$_d$ and i$_q$ are eliminated from the equation for calculating L$_m$). Therefore, a value of L$_m$ expressed as a function of i$_{qm}$ can be calculated based on is on the assumption that "i$_\delta$≈i$_{qm}$" holds. Then, using a value of the calculated L$_m$, the axial error Δθ$_m$ can be calculated from the equation (41).

$$i_d = \frac{\Phi_a}{2(L_q - L_d)} - \sqrt{\frac{\Phi_a^2}{4(L_q - L_d)^2} + i_q^2} \quad (45)$$

Application of the dmqm method described above to the above-mentioned second estimating method and the second example will be considered. As understood from comparison between the equation obtained by ignoring the third term in the right side of the equation (38) as described above and the above-mentioned equation (2-3), if the second estimating method is applied to the case where dm-axis and qm-axis are estimated by the sensorless control (i.e., in the case where a control is performed so that the axial error Δθ$_m$ is converged into zero), the estimated current can be calculated by using the equations (2-6a) and (2-7a) as below. The equations (2-6a) and (2-7a) as below correspond to equations that are obtained by replacing E$_{exγ}$ and E$_{exδ}$ in the above-mentioned equations (2-6) and (2-7) with E$_{exmγ}$ and E$_{exmδ}$. In other words, when the dmqm method is used, the current estimator 23a shown in FIG. 9 should calculate the estimated current in accordance with the equations (2-6a) and (2-7a) as below. In this case, as values of E$_{exmγ}$ and E$_{exmδ}$, the values thereof that have been calculated for determining the axial error Δθ$_m$ can be used.

$$i_{\gamma e}(k+1) = i_\gamma(k) + \frac{v_\gamma*(k) - E_{exm\gamma}(k) + \omega_e(k)L_q i_\delta(k) - R_a i_\gamma(k)}{L_d/T_s} \quad (2\text{-}6a)$$

$$i_{\delta e}(k+1) = i_\delta(k) + \frac{v_\delta*(k) - E_{exm\delta}(k) - \omega_e(k)L_q i_\gamma(k) - R_a i_\delta(k)}{L_d/T_s} \quad (2\text{-}7a)$$

Application of the above-mentioned dmqm method to the above-mentioned fourth estimating method and the fourth example is considered. The above-mentioned equations (4-1) and (4-2) are rewritten so as to be compatible with the dmqm method, so that the equations (4-1a) and (4-2a) are obtained as below. For this reason, the equation (4-3) is obtained, and finally the above-mentioned equations (4-8) and (4-9) are obtained in the same manner as the case where the d-axis and the q-axis are estimated. In other words, also in the case where the dmqm method is applied to the fourth example, an operation of the current estimator 23c shown in FIG. 11 is the same as that in the fourth example as described above.

$$\begin{aligned} v_\gamma^* &= v_\gamma \\ &= v_\gamma' - \omega_e L_m i_\delta + E_{exm\gamma} \\ &= K_{i\gamma}\left(1 + \frac{1}{T_{id}s}\right)(i_\gamma^* - i_\gamma) - \omega_e L_m i_\delta + E_{exm\gamma} \end{aligned} \quad (4\text{-}1a)$$

$$\begin{aligned} v_\delta^* &= v_\delta \\ &= v_\delta' + \omega_e L_m i_\gamma + E_{exm\delta} \\ &= K_{i\delta}\left(1 + \frac{1}{T_{id}s}\right)(i_\delta^* - i_\delta) + \omega_e L_m i_\gamma + E_{exm\delta} \end{aligned} \quad (4\text{-}2a)$$

Variations

Although the examples of the motor driving system to which the present invention is applied are described above, the present invention can include various variations (or other examples). Hereinafter, Note 1 to Note 5 will be written as variations (or other examples) or annotations. Contents of each Note can be combined with others as long as there is no contradiction.

[Note 1]

Although the above description is about the case where the inverter 2 utilizes the three-phase modulation, the present invention does not depend on a modulation type. For example, if the inverter 2 performs a two-phase modulation, the energizing pattern thereof is different from that of the three-phase modulation shown in FIG. 3. Since the lower arm of the minimum phase is always turned on in the two-phase modulation, the energizing patterns corresponding to the period T0-T1 and the period T6-T7 shown in FIG. 4 do not exist. However, if it is structured that the bus current can be detected by the energizing patterns corresponding to the period T1-T2 and the period T2-T3, current of the maximum phase and the minimum phase can be detected without an exception.

[Note 2]

In addition, the individual portions of the above-mentioned motor driving system can utilize freely all the values generated in the motor driving system, as necessity.

[Note 3]

In addition, a part or a whole of functions of the controller 3 (see FIG. 1) can be realize by software (a program) embedded in a general-purpose microcomputer or the like, for example. If the controller 3 is realized by software, the block diagram indicating the structure of each portion of the controller 3 shows a functional block diagram. Of course, the controller 3 may be made up of only hardware without using software (a program).

[Note 4]

In addition, for example, the controller 3 works as the motor control device. It is possible to consider that the motor control device includes the current sensor 5 shown in FIG. 1. In addition, for example, the voltage calculating portion 25 or 25a shown in FIG. 8-11 works as a specified voltage value deriving portion.

[Note 5]

In addition, expression using only a sign ($i_\gamma$ or the like) may indicates a state quantity (state variable) or the like corresponding to the sign for simplification of expression in this specification. In other words, "$i_\gamma$" and "γ-axis current $i_\gamma$" for example, indicate the same meaning in this specification.

The present invention is suitable for any electric equipment that uses a motor. Since vibration and noise when the motor 1 is driven can be controlled to low levels as described above, in particular, it is suitable for a compressor for a refrigerator or an air conditioner for a motor vehicle.

The deriving method (or estimating method) of every value to be derived (or estimated) including the above-mentioned various kinds of specified values ($v_\gamma^*$, $v_\delta^*$ and the like) and other state quantity ($\omega_e$ and the like) can be any method. For example, the values may be derived (or estimated) by calculation inside the controller 3 or may be derived (or estimated) by looking up a table whose data are preset.

What is claimed is:

1. A motor control device comprising:
   a current detecting portion that detects current flowing between an inverter for driving a three-phase motor and a DC power supply, as detected current; and
   a current estimator that estimates a current vector of the motor on a rotating coordinate that rotates along with rotation of a rotor of the motor,
   wherein
   the motor control device detects motor current flowing in the motor by using one of a detecting result of the current detecting portion and an estimation result of the current estimator, so as to control the motor via the inverter based on the detected motor current, and
   the current estimator estimates, by using the motor current detected at a first timing, the current vector at a second timing later than the first timing.

2. The motor control device according to claim 1, wherein the current estimator estimates the current vector at the second timing based on the motor current detected at the first timing and a specified voltage value indicating a voltage value that an applied voltage to the motor should follow.

3. The motor control device according to claim 2, further comprising a specified voltage value deriving portion that derives the specified voltage value based on the motor current and a specified current value indicating a current value that the motor current should follow, wherein
   the inverter drives the motor in accordance with the specified voltage value, and
   the current estimator estimates orthogonal biaxial components that form the current vector at the second timing, based on the motor current detected at the first timing and the specified voltage value.

4. The motor control device according to claim 1, wherein the current estimator estimates the current vector at the second timing based on the motor current detected at the first timing and a specified current value indicating a current value that the motor current should follow.

5. The motor control device according to claim 4, further comprising a specified voltage value deriving portion that derives the specified current value based on a given external specified value, and derives a specified voltage value indicating a voltage value that an applied voltage to the motor should follow by decoupling control, so that the motor current follows the specified current value, wherein the inverter drives the motor in accordance with the specified voltage value, and the current estimator estimates orthogonal biaxial components that form the current vector at the second timing, based on the motor current detected at the first timing and the specified current value.

6. The motor control device according to claim 1, wherein the inverter is a PWM inverter that generates a three-phase PWM signal in accordance with a specified three-phase voltage value derived based on the detected motor current and a specified current value indicating a current value that the motor current should follow, phase current is supplied to an armature winding of each phase provided to the motor in accordance with a pulse width of the PWM signal of each phase, and the motor control device further comprises a switch controlling portion that switches between detection of the motor current based on the detected current and detection of the motor current based on the current vector, in accordance with the pulse width of the PWM signal of each phase.

7. The motor control device according to claim 1, further comprising a switch controlling portion that switches between detection of the motor current based on the detected current and detection of the motor current based on the current vector, in accordance with a voltage vector applied to the motor.

8. A motor driving system comprising:

a three-phase motor;

an inverter that drives the motor; and a motor control device according to claim 1 that controls the inverter so as to control the motor.

* * * * *